(12) United States Patent
Kim et al.

(10) Patent No.: US 12,551,620 B2
(45) Date of Patent: Feb. 17, 2026

(54) DEVICE FOR CONTROLLING INJECTION OF MEDICINAL FLUID

(71) Applicant: IPV, Seoul (KR)

(72) Inventors: Jesse Jaejin Kim, Seongnam-si (KR); Ho Min Jeon, Yongin-si (KR); Yongho Jeon, Gwangmyeong-si (KR)

(73) Assignee: IPV, Seoul (KR)

( * ) Notice: Subject to any disclaimer, the term of this patent is extended or adjusted under 35 U.S.C. 154(b) by 740 days.

(21) Appl. No.: 17/905,494

(22) PCT Filed: Mar. 4, 2021

(86) PCT No.: PCT/KR2021/002684
§ 371 (c)(1),
(2) Date: Sep. 1, 2022

(87) PCT Pub. No.: WO2021/177747
PCT Pub. Date: Sep. 10, 2021

(65) Prior Publication Data
US 2023/0118571 A1    Apr. 20, 2023

(30) Foreign Application Priority Data

Mar. 4, 2020  (KR) .................. 10-2020-0027220

(51) Int. Cl.
*A61M 5/172*  (2006.01)
*A61M 5/142*  (2006.01)

(52) U.S. Cl.
CPC ...... *A61M 5/1723* (2013.01); *A61M 5/14248* (2013.01); *A61M 2005/14208* (2013.01);
(Continued)

(58) Field of Classification Search
None
See application file for complete search history.

(56) References Cited

U.S. PATENT DOCUMENTS 7,642,232 B2 *  1/2010  Green ..................... A61P 3/10
514/6.9
7,806,854 B2   10/2010  Damiano et al.
(Continued)

FOREIGN PATENT DOCUMENTS

JP      49-073885    7/1974
JP      5389147 B2   1/2014
(Continued)

OTHER PUBLICATIONS

International Search Report issued for International Patent Application No. PCT/KR2021/002684, dated Jul. 22, 2021 in 5 pages.
(Continued)

*Primary Examiner* — Manuel A Mendez
(74) *Attorney, Agent, or Firm* — PnK IP LLC

(57) ABSTRACT

Provided is a liquid medication control injection device including a blood glucose measuring unit configured to measure blood glucose of target of injection at least a plurality of times, sequentially, a first liquid medication injection unit configured to inject a first liquid medication containing a component for controlling a decrease in blood glucose of the target of injection to the target of injection, and a second liquid medication injection unit configured to inject a second liquid medication containing a component for controlling an increase in blood glucose of the target of injection, wherein the component of the second liquid medication is different from that of the first liquid medication.

7 Claims, 21 Drawing Sheets

(52) U.S. Cl.
CPC ............... *A61M 2005/1726* (2013.01); *A61M 2205/3576* (2013.01); *A61M 2230/201* (2013.01)

(56) References Cited

U.S. PATENT DOCUMENTS

| | | | | |
|---|---|---|---|---|
| 7,811,279 | B2* | 10/2010 | John | A61M 5/1408 |
| | | | | 604/890.1 |
| 8,343,092 | B2* | 1/2013 | Rush | A61B 5/0002 |
| | | | | 604/503 |
| 2007/0088271 | A1 | 4/2007 | Richards | |
| 2008/0269723 | A1* | 10/2008 | Mastrototaro | A61B 5/6849 |
| | | | | 604/890.1 |
| 2011/0106049 | A1 | 5/2011 | Damiano et al. | |
| 2013/0253465 | A1 | 9/2013 | Holtwick et al. | |
| 2016/0001002 | A1 | 1/2016 | Yodfat et al. | |
| 2016/0345873 | A1* | 12/2016 | Patel | A61B 5/1473 |
| 2020/0063176 | A1* | 2/2020 | Lu | G01N 27/3273 |

FOREIGN PATENT DOCUMENTS

| | | |
|---|---|---|
| KR | 10-2017-0088177 A | 8/2017 |
| KR | 10-2018-0028232 A | 3/2018 |
| KR | 10-2018-0028823 A | 3/2018 |
| KR | 10-2018-0090076 A | 8/2018 |
| KR | 10-2020-0021272 | 2/2020 |
| WO | 2006124716 | 11/2006 |

OTHER PUBLICATIONS

Written Opinion issued for International Patent Application No. PCT/KR2021/002684, dated Jul. 22, 2021 in 4 pages.

\* cited by examiner

DEVICE FOR CONTROLLING INJECTION OF MEDICINAL FLUID

CROSS-REFERENCE TO RELATED APPLICATIONS

The present application is a U.S. national phase application under 35 U.S.C. § 371 of International Application No. PCT/KR2021/002684, filed on Mar. 4, 2021, which claims the benefit of Korean Patent Application No. 10-2020-0027220, filed on Mar. 4, 2020, the entire disclosure of each of which is incorporated herein by reference.

TECHNICAL FIELD

Embodiments of the present disclosure relate to a liquid medication control injection device.

DESCRIPTION OF THE RELATED ART

When a function in the body does not operate normally, an external injection of a liquid medication is needed. For example, when the blood glucose level cannot be controlled (e.g., diabetes), external injection of a liquid medication may be needed.

Meanwhile, since such a liquid medication injection device for injecting a liquid medication to a target of injection often needs to be used a plurality of number of times or for a long period of time, the target of injection experiences discomfort and pain.

In an embodiment, in some cases, a target of injection may need injection of various drugs. For example, as the blood glucose decreases or increases, it is necessary to inject mutually complementary drugs.

Meanwhile, in order to increase the effect through injection of a liquid medication to a patient, a liquid medication injection device needs to be controlled to precisely inject the liquid medication into the patient's body. However, there is a limit to precisely injecting a small amount of a liquid medication, for example, one or more sequential times through a small liquid medication injection device.

SUMMARY OF CERTAIN INVENTIVE ASPECTS

Embodiments of the present disclosure provide a liquid medication control injection device that improves convenience and stability.

According to an embodiment of the present disclosure, a liquid medication control injection device includes a blood glucose measuring unit configured to measure blood glucose of target of injection at least a plurality of sequential number of times, a first liquid medication injection unit configured to inject a first liquid medication containing a component for controlling a decrease in blood glucose of the target of injection to the target of injection, and a second liquid medication injection unit configured to inject a second liquid medication containing a component for controlling an increase in blood glucose of the target of injection, wherein the component of the second liquid medication is different from that of the first liquid medication.

According to the present embodiment, the first liquid medication injection unit and the second liquid medication injection unit may be formed to selectively inject the first liquid medication or the second liquid medication into the target of injection.

According to the present embodiment, the liquid medication control injection device may further include a controller configured to control driving of the first liquid medication injection unit and the second liquid medication injection unit according to blood glucose information measured by the blood glucose measuring unit.

According to the present embodiment, the first liquid medication injection unit or the second liquid medication injection unit may include a housing, and the blood glucose measuring unit may be disposed inside the housing of the first liquid medication injection unit or the second liquid medication injection unit.

According to the present embodiment, the liquid medication control injection device may further include a housing formed to accommodate at least one of the blood glucose measuring unit, the first liquid medication injection unit, and the second liquid medication injection unit.

According to the present embodiment, the liquid medication control injection device may be formed to transmit one or more pieces of information by communicating with a terminal provided separately from the liquid medication control injection device.

According to the present embodiment, the liquid medication control injection device may be attached to an outside of a user's body to function a wearable device.

Other aspects, features and advantages other than those described above will become apparent from the following detailed description of the drawings, claims and disclosure.

A liquid medication control injection device according to the present disclosure may improve convenience and stability.

DETAILED DESCRIPTION OF CERTAIN ILLUSTRATIVE EMBODIMENTS

Figure 1:
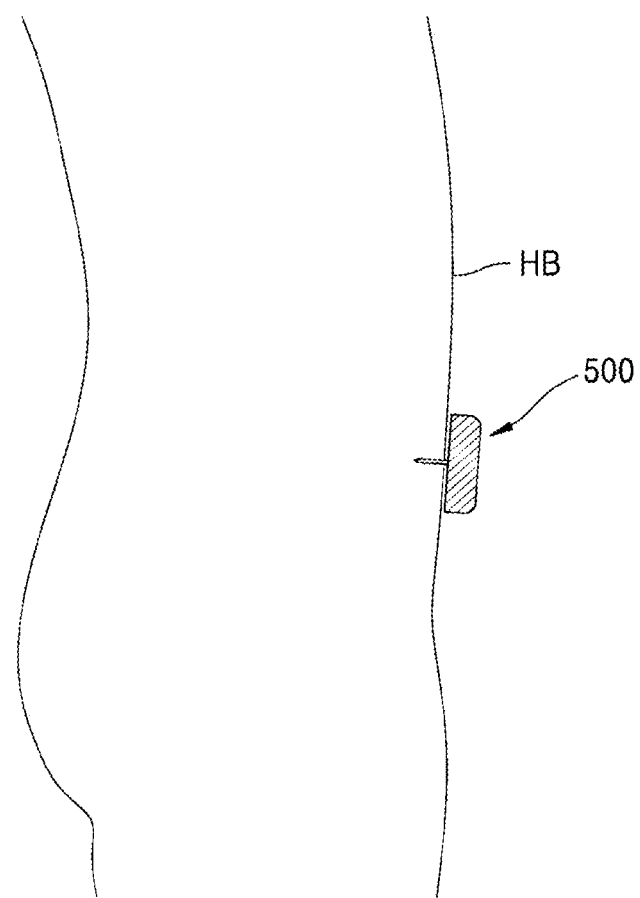
FIG. 1 is a diagram showing use of a liquid medication control injection device according to an embodiment of the present disclosure.

Since the present disclosure can apply various transformations and can have various embodiments, specific embodiments are illustrated in the drawings and described in detail in the detailed description. Effects and features of the present disclosure, and a method of achieving them will become clear with reference to the embodiments described below in detail in conjunction with the drawings. However, the present disclosure is not limited to the embodiments disclosed below and may be implemented in various forms.

Hereinafter, embodiments of the present disclosure will be described in detail with reference to the accompanying drawings, and when described with reference to the drawings, the same or corresponding components are given the same reference numerals, and overlapping descriptions thereof will be omitted.

In the following embodiments, terms such as first, second, etc. are used for the purpose of distinguishing one component from another, not in a limiting sense.

In the following examples, the singular expression includes the plural expression unless the context clearly dictates otherwise.

In the following embodiments, terms such as include or have means that the features or components described in the specification are present, and the possibility that one or more other features or components will be added is not excluded in advance.

In the drawings, the size of the components may be exaggerated or reduced for convenience of description. For example, since the size and thickness of each component shown in the drawings are arbitrarily indicated for convenience of description, the present invention is not necessarily limited to the illustrated one.

In the following embodiments, the x-axis, the y-axis, and the z-axis are not limited to three axes on a Cartesian coordinate system and may be interpreted in a broad sense including them. For example, the x-axis, y-axis, and z-axis may be orthogonal to each other, but may refer to different directions that are not orthogonal to each other.

In cases where certain embodiments may be implemented otherwise, a specific process sequence may be performed different from the described sequence. For example, two processes described in succession may be performed substantially simultaneously or may be performed in an order opposite to the order described.

Figure 2:
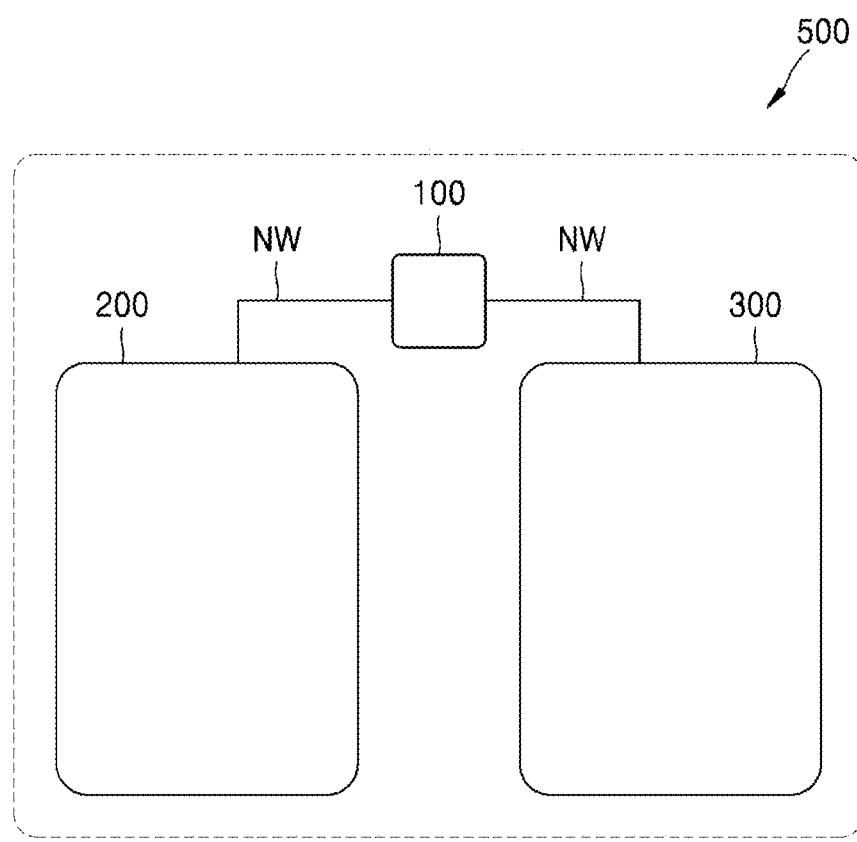
FIG. 2 is a schematic diagram for describing the liquid medication control injection device of FIG. 1.

FIG. 1 is a diagram showing use of a liquid medication control injection device according to an embodiment of the present disclosure, and FIG. 2 is a schematic diagram for describing the liquid medication control injection device of FIG. 1.

Referring to FIG. 1, a liquid medication injection device 500 provided outside a user's body part H is shown.

According to an embodiment, as shown in FIG. 1, an injection needle for injecting one or more liquid medications or a blood glucose measurement sensor may be inserted into the body part HB.

When it is difficult a user to naturally control blood glucose due to diabetes or other reasons, an abnormal increase or decrease in blood glucose can be controlled through external injection of a drug.

Through the liquid medication injection device 500 of the present embodiment, a user may inject different liquid medications to suppress an abnormal increase or decrease in blood glucose.

Referring to FIG. 2, the liquid medication injection device 500 of the present embodiment may include a blood glucose measuring unit 100, a first liquid medication injection unit 200, and a second liquid medication injection unit 300.

The blood glucose measuring unit 100 may be configured to measure a user's blood glucose sequentially at least a plurality of number of times.

According to an optional embodiment, the blood glucose measuring unit 100 may continuously measure a user's blood glucose periodically or at irregular intervals for at least a set period of time and may include, for example, a continuous glucose monitoring (CGM).

The first liquid medication injection unit 200 may be configured to reflect blood glucose information measured by the blood glucose measuring unit 100 and inject a first liquid medication containing ingredients for controlling a decrease in a user's blood glucose to the user.

For example, the first liquid medication injected to a user through the first liquid medication injection unit 200 may contain insulin.

According to an optional embodiment, the first liquid medication injection unit 200 may include a storage unit (not shown) for storing the first liquid medication.

In an embodiment, according to an optional embodiment, the first liquid medication injection unit 200 may include a module for injecting the first liquid medication to a user (e.g., a needle module (not shown)), and the first liquid medication may be easily injected through the skin of the user through the needle module.

According to an optional embodiment, the first liquid medication injection unit 200 may include a driving unit (not shown) for transferring the first liquid medication from the storage unit to the needle module. For example, the driving unit may include an actuator. In an embodiment, the driving unit may include a pump. A set amount of the first liquid medication may be injected into a user by driving the driving unit.

According to an optional embodiment, a driving unit included in a first liquid medication injection unit or a second liquid medication injection unit according to embodiments to be described later may also include an actuator or, according to another optional embodiment, may include a pump.

The first liquid medication injection unit 200 may inject the first liquid medication once, a plurality of number of times, or continuously as needed by using blood glucose information from the blood glucose measuring unit 100.

According to an optional embodiment, the blood glucose measuring unit 100 and the first liquid medication injection unit 200 may each include a communication unit NW to be connected to each other to transmit information via a wire or wirelessly.

According to an optional embodiment, through a controller (not shown), when a blood glucose level measured by the blood glucose measuring unit 100 exceeds a set range, the first liquid medication may be injected by the first liquid medication injection unit 200. For example, the driving unit may be controlled through the controller (not shown) to control injection of a liquid medication to the needle module.

The controller (not shown) may be included in the blood glucose measuring unit 100 and may be included in the first liquid medication injection unit 200 or the second liquid medication injection unit 300.

In an embodiment, the controller (not shown) may be provided as a separate member.

According to an optional embodiment, the controller notifies a value measured by the blood glucose measuring unit 100 to a user, and the user may manipulate the controller to control the injection of the first liquid medication injection unit 200 or the second liquid medication injection unit 300.

According to an optional embodiment, the controller may detect the interaction between injections of the first liquid medication injection unit 200 and the second liquid medication injection unit 300 and control each of the first liquid medication injection unit 200 and the second liquid medication injection unit 300. For example, the controller may reduce or prevent an effect due to the interaction between the first liquid medication and the second liquid medication.

For example, the controller may limit the injection of the second liquid medication for a maximum effect occurring time according to the injection of the first liquid medication after the injection of the first liquid medication, and specifically, may block or reduce the injection of the second liquid medication. The maximum effect occurring time may be a pre-set time. In an embodiment, according to an optional embodiment, the maximum effect occurring time is a variable value, and the controller may calculate the maximum effect occurring time based on a value measured by the blood glucose measuring unit 100 or by determining a change in the value and analyze whether to block or reduce the injection of the second liquid medication during the maximum effect occurring time.

In another example, the controller may limit the injection of the first liquid medication for a maximum effect occurring time according to the injection of the second liquid medication after the injection of the second liquid medication, and specifically, may block or reduce the injection of the first liquid medication. The maximum effect occurring time may be a pre-set time. In an embodiment, according to an optional embodiment, the maximum effect occurring time is a variable value, and the controller may calculate the maximum effect occurring time based on a value measured by the blood glucose measuring unit 100 or by determining a change in the value and analyze whether to block or reduce the injection of the first liquid medication during the maximum effect occurring time.

According to an optional embodiment, the controller may calculate the respective injection amounts of the first liquid medication and the second liquid medication in consideration of the antagonistic actions of the first liquid medication and the second liquid medication.

For example, time information such as the half-life periods of the first liquid medication and the second liquid medication and times until the first liquid medication and the second liquid medication are completely discharged out of the body may be utilized, wherein such values may be pre-set values. The injection amount of each of the first liquid medication and the second liquid medication may be calculated by using such time information.

The injection of the first liquid medication and the injection of the second liquid medication through the controller may all be selectively applied to embodiments to be described later.

On the other hand, in embodiments to be described later, when a needle module for injecting the first liquid medication and a needle module for injecting the second liquid medication are separately provided, the respective needle modules may be controlled to facilitate independent control of the injection of the first liquid medication and the second liquid medication.

Figure 15:
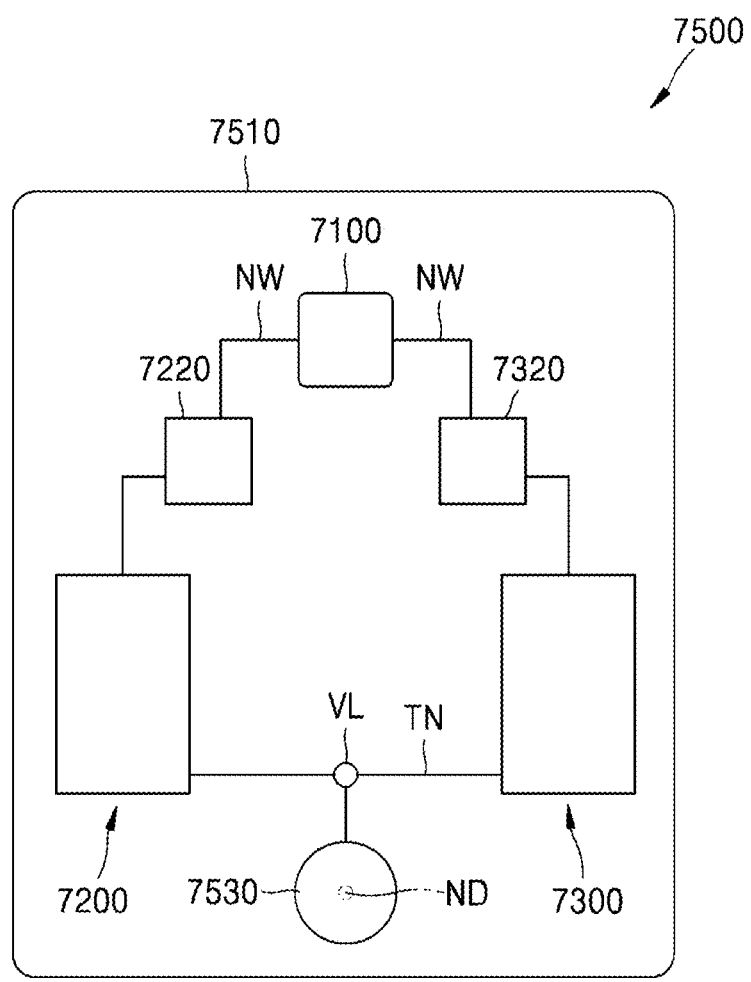
FIG. 15 is a schematic view for describing a liquid medication control injection device according to another embodiment of the present disclosure.

In an embodiment, when a common needle module for injecting the first liquid medication and the second liquid medication is formed, as a specific example, in the case of FIG. 15, the injection of the first liquid medication and the injection of the second liquid medication may be controlled through a valve VL. According to an optional embodiment, a first liquid medication injection limiting member (not shown) provided between the valve VL and a first liquid medication injection unit 7200 or provided in the first liquid medication injection unit 7200 may be further disposed, thereby facilitating control of limitation of the first liquid medication when it is necessary to limit unnecessary mixing of the first liquid medication and the second liquid medication, e.g., replacement injection of the first liquid medication and the second liquid medication.

In an embodiment, according to an optional embodiment, a second liquid medication injection limiting member (not shown) provided between the valve VL and a second liquid medication injection unit 7300 or provided in the second liquid medication injection unit 7300 may be further disposed, thereby facilitating control of limitation of the second liquid medication when it is necessary to limit unnecessary mixing of the first liquid medication and the second liquid medication, e.g., replacement injection of the first liquid medication and the second liquid medication.

The second liquid medication injection unit 300 may be configured to reflect blood glucose information measured by the blood glucose measuring unit 100 and inject a second liquid medication containing ingredients for controlling an increase in a user's blood glucose to the user.

For example, the second liquid medication injected to a user through the second liquid medication injection unit 300 may contain glucagon.

According to an optional embodiment, the second liquid medication injection unit 300 may include a storage unit (not shown) for storing the second liquid medication.

In an embodiment, according to an optional embodiment, the second liquid medication injection unit 300 may include a module for injecting the second liquid medication to a user (e.g., a needle module (not shown)), and the second liquid medication may be easily injected through the skin of the user through the needle module.

According to an optional embodiment, the second liquid medication injection unit 300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 300 may inject the second liquid medication once, a plurality of number of times, or continuously as needed by using blood glucose information from the blood glucose measuring unit 100.

According to an optional embodiment, the blood glucose measuring unit 100 and the second liquid medication injection unit 300 may each include the communication unit NW to transmit information via a wire or wirelessly.

According to an optional embodiment, through a controller (not shown), when a blood glucose level measured by the blood glucose measuring unit 100 is less than the lower limit of a set range, the second liquid medication may be injected by the second liquid medication injection unit 300. For example, the driving unit may be controlled to control injection of a liquid medication to the needle module.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

For example, when a blood glucose value measured by the blood glucose measuring unit exceeds a set range, a first liquid medication such as insulin may be injected through the first liquid medication injection unit to decrease the blood glucose level, such that the blood glucose level is within the normal blood glucose range.

In an embodiment, in another example, when a blood glucose value measured by the blood glucose measuring unit is less than the set range, a second liquid medication such as glucagon may be injected through the second liquid medication injection unit to increase the blood glucose level, such that the blood glucose level is within the normal blood glucose range.

Such control may be performed through various methods. For example, a user or a guardian may recognize a value measured by the blood glucose measuring unit and control the controller for driving the first liquid medication injection unit or the second liquid medication injection unit.

In an embodiment, in another example, the controller may receive blood glucose level information measured by the blood glucose measuring unit in real time and, according to a pre-set blood glucose setting range, may inject the first liquid medication through the first liquid medication injection unit when a measured blood glucose level exceeds the pre-set blood glucose range and inject the second liquid medication through the second liquid medication injection unit when the measured blood glucose level is less than the pre-set blood glucose range.

Therefore, injection of the first liquid medication and injection of the second liquid medications may be precisely controlled with increased user convenience and without inaccurate liquid medication control due to inexperienced operation of a user, thereby precisely controlling the blood glucose of the user.

Figure 3:
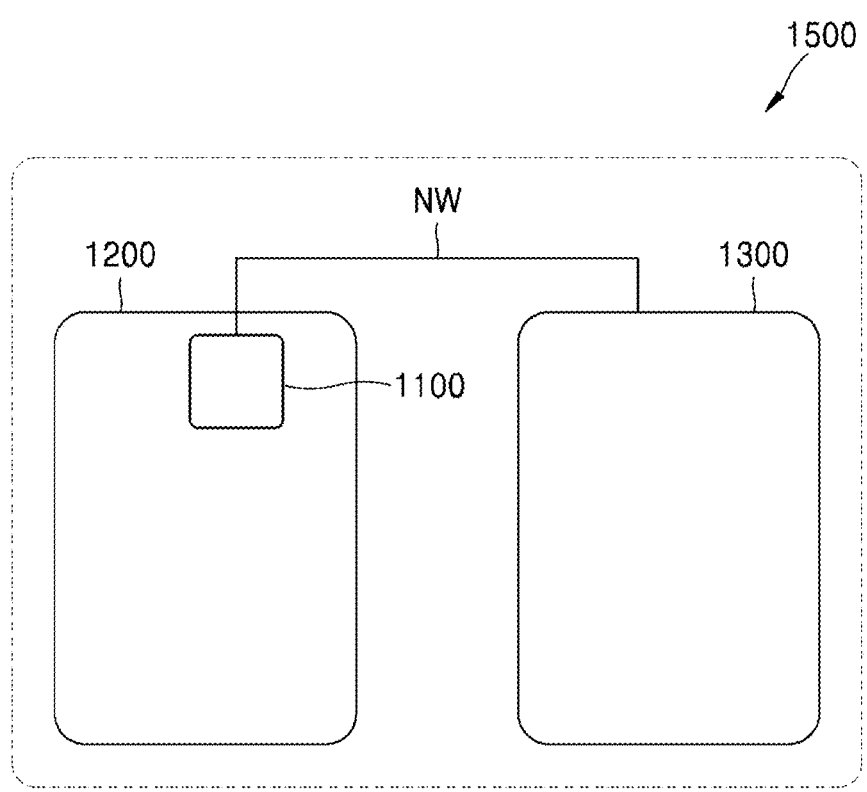
FIG. 3 is a schematic view for describing a liquid medication control injection device according to another embodiment of the present disclosure.

FIG. 3 is a schematic view for describing a liquid medication control injection device according to another embodiment of the present disclosure.

Referring to FIG. 3, a liquid medication injection device 1500 of the present embodiment may include a blood glucose measuring unit 1100, a first liquid medication injection unit 1200, and a second liquid medication injection unit 1300.

The blood glucose measuring unit 1100 may be configured to measure a user's blood glucose sequentially at least a plurality of number of times.

According to an optional embodiment, the blood glucose measuring unit 1100 may continuously measure a user's blood glucose periodically or at irregular intervals for at least a set period of time and may include, for example, a continuous glucose monitoring (CGM).

The blood glucose measuring unit 1100 may be formed to be included in the first liquid medication injection unit 1200. For example, the blood glucose measuring unit 1100 may be disposed at one region or the entire region inside a housing (not shown) of the first liquid medication injection unit 1200.

The first liquid medication injection unit 1200 may be configured to reflect blood glucose information measured by the blood glucose measuring unit 1100 and inject a first liquid medication containing ingredients for controlling a decrease in a user's blood glucose to the user.

For example, the first liquid medication injected to a user through the first liquid medication injection unit 1200 may contain insulin.

According to an optional embodiment, the first liquid medication injection unit 1200 may include a storage unit (not shown) for storing the first liquid medication.

In an embodiment, according to an optional embodiment, the first liquid medication injection unit 1200 may include a module for injecting the first liquid medication to a user (e.g., a needle module (not shown)), and the first liquid medication may be easily injected through the skin of the user through the needle module.

According to an optional embodiment, the first liquid medication injection unit 1200 may include a driving unit (not shown) for transferring the first liquid medication from the storage unit to the needle module. For example, the driving unit may include a pump, and a set amount of the first liquid medication may be injected to a user through the pumping of the pump.

The first liquid medication injection unit 1200 may inject the first liquid medication once, a plurality of number of times, or continuously as needed by using blood glucose information from the blood glucose measuring unit 1100.

The first liquid medication injection unit 1200 may be integrally formed with the blood glucose measuring unit 1100. For example, at least one region of the blood glucose measuring unit 1100 may be disposed in one region, e.g., the housing, of the first liquid medication injection unit 1200.

In an embodiment, according to an optional embodiment, the blood glucose measuring unit 1100 may be formed on one region of the first liquid medication injection unit 1200.

For example, the blood glucose measuring unit 1100 may be disposed on a substrate-like body of the first liquid medication injection unit 1200.

According to an optional embodiment, through a controller (not shown), when a blood glucose level measured by the blood glucose measuring unit 1100 exceeds a set range, the first liquid medication may be injected by the first liquid medication injection unit 1200. For example, the driving unit may be controlled through the controller (not shown) to control injection of a liquid medication to the needle module.

The controller (not shown) may be included in the blood glucose measuring unit 1100 and may be included in the first liquid medication injection unit 1200 or the second liquid medication injection unit 1300.

In an embodiment, the controller (not shown) may be provided as a separate member.

According to an optional embodiment, the controller notifies a value measured by the blood glucose measuring unit 1100 to a user, and the user may manipulate the controller to control the injection of the first liquid medication injection unit 1200 or the second liquid medication injection unit 1300.

The second liquid medication injection unit 1300 may be configured to reflect blood glucose information measured by the blood glucose measuring unit 1100 and inject a second liquid medication containing ingredients for controlling an increase in a user's blood glucose to the user.

For example, the second liquid medication injected to a user through the second liquid medication injection unit 1300 may contain glucagon.

According to an optional embodiment, the second liquid medication injection unit 1300 may include a storage unit (not shown) for storing the second liquid medication.

In an embodiment, according to an optional embodiment, the second liquid medication injection unit 1300 may include a module for injecting the second liquid medication to a user (e.g., a needle module (not shown)), and the second liquid medication may be easily injected through the skin of the user through the needle module.

According to an optional embodiment, the second liquid medication injection unit 1300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 1300 may inject the second liquid medication once, a plurality of number of times, or continuously as needed by using blood glucose information from the blood glucose measuring unit 1100.

According to an optional embodiment, the blood glucose measuring unit 1100 and the second liquid medication injection unit 1300 may each include the communication unit NW to transmit information via a wire or wirelessly.

According to an optional embodiment, through a controller (not shown), when a blood glucose level measured by the blood glucose measuring unit 1100 is less than the lower limit of a set range, the second liquid medication may be injected by the second liquid medication injection unit 1300. For example, the driving unit may be controlled to control injection of a liquid medication to the needle module.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the blood glucose measuring unit may be formed, such that the blood glucose measuring unit is included in the first liquid medication injection unit or at least one region of the blood glucose measuring unit is included in the first liquid medication injection unit. For example, at least one region of the blood glucose measuring unit may be disposed within the housing of the first liquid medication injection unit. In another example, at least one region of the blood glucose measuring unit may be disposed on a substrate-like body of the first liquid medication injection unit.

In an embodiment, the blood glucose measuring unit may be integrated with the first liquid medication injection unit, thereby improving convenience of handling and management of the blood glucose measuring unit and the first liquid medication injection unit.

In an embodiment, although not shown, the blood glucose measuring unit may be formed, such that the blood glucose measuring unit is included in the second liquid medication injection unit or at least one region of the blood glucose measuring unit is included in the second liquid medication injection unit.

Through the liquid medication control injection device of the present embodiment, it is possible to increase user convenience and precisely control the injection of the first liquid medication and injection of the second liquid medication, thereby precisely controlling the blood glucose of a user.

Figure 4:
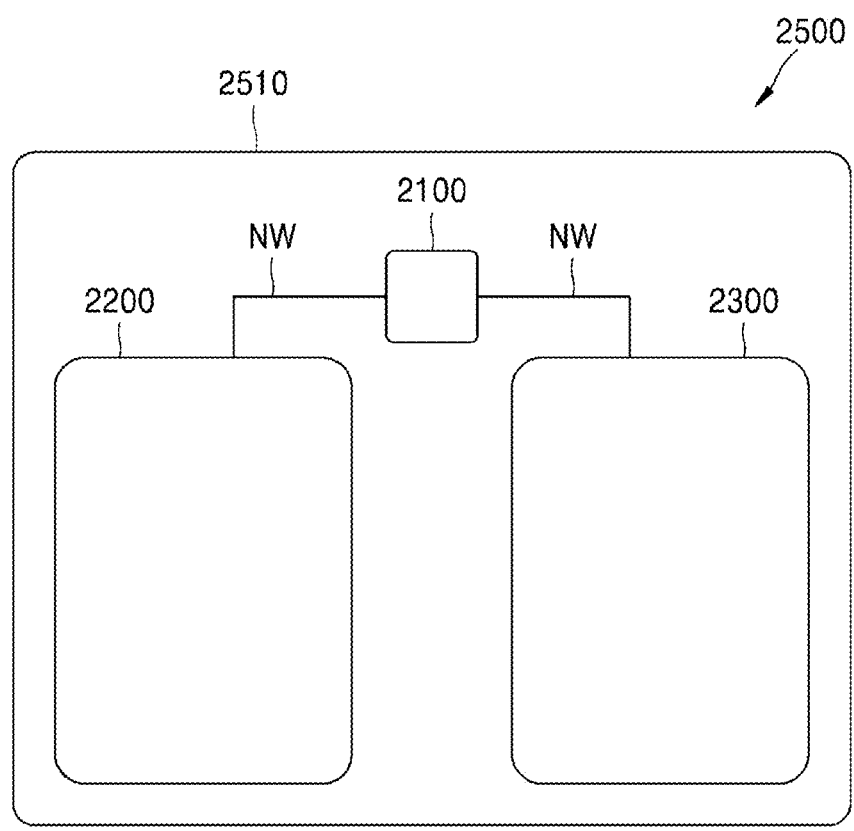
FIG. 4 is a schematic view for describing a liquid medication control injection device according to another embodiment of the present disclosure.

FIG. 4 is a schematic view for describing a liquid medication control injection device according to another embodiment of the present disclosure.

Referring to FIG. 4, a liquid medication injection device 2500 of the present embodiment may include a blood glucose measuring unit 2100, a first liquid medication injection unit 2200, a second liquid medication injection unit 2300, and a housing 2510.

The housing 2510 may have an integrated shape, e.g., a box-like shape.

According to an optional embodiment, the housing 2510 may have a shape including a detachable cover.

One region or the entire region of each of the blood glucose measuring unit 2100, the first liquid medication injection unit 2200, and the second liquid medication injection unit 2300 may be covered by the housing 2510.

For example, a cover (not shown) of the housing 2510 may have a shape that covers one region or the entire region of each of the blood glucose measuring unit 2100, the first liquid medication injection unit 2200, and the second liquid medication injection unit 2300.

The blood glucose measuring unit 2100 may be configured to measure a user's blood glucose sequentially at least a plurality of number of times.

According to an optional embodiment, the blood glucose measuring unit 2100 may continuously measure a user's blood glucose periodically or at irregular intervals for at least a set period of time and may include, for example, a continuous glucose monitoring (CGM).

The first liquid medication injection unit 2200 may be configured to reflect blood glucose information measured by the blood glucose measuring unit 2100 and inject a first liquid medication containing ingredients for controlling a decrease in a user's blood glucose to the user.

For example, the first liquid medication injected to a user through the first liquid medication injection unit 2200 may contain insulin.

According to an optional embodiment, the first liquid medication injection unit 2200 may include a storage unit (not shown) for storing the first liquid medication.

In an embodiment, according to an optional embodiment, the first liquid medication injection unit 2200 may include a module for injecting the first liquid medication to a user (e.g., a needle module (not shown)), and the first liquid medication may be easily injected through the skin of the user through the needle module.

According to an optional embodiment, the first liquid medication injection unit 2200 may include a driving unit (not shown) for transferring the first liquid medication from the storage unit to the needle module. For example, the driving unit may include a pump, and a set amount of the first liquid medication may be injected to a user through the pumping of the pump.

The first liquid medication injection unit 2200 may inject the first liquid medication once, a plurality of number of times, or continuously as needed by using blood glucose information from the blood glucose measuring unit 2100.

According to an optional embodiment, the blood glucose measuring unit 2100 and the first liquid medication injection unit 2200 may each include a communication unit NW to be connected to each other to transmit information via a wire or wirelessly.

According to an optional embodiment, through a controller (not shown), when a blood glucose level measured by the blood glucose measuring unit 2100 exceeds a set range, the first liquid medication may be injected by the first liquid medication injection unit 2200. For example, the driving unit may be controlled through the controller (not shown) to control injection of a liquid medication to the needle module.

The controller (not shown) may be included in the blood glucose measuring unit 2100 and may be included in the first liquid medication injection unit 2200 or the second liquid medication injection unit 2300.

In an embodiment, the controller (not shown) may be provided as a separate member.

According to an optional embodiment, the controller notifies a value measured by the blood glucose measuring unit 2100 to a user, and the user may manipulate the controller to control the injection of the first liquid medication injection unit 2200 or the second liquid medication injection unit 2300.

The second liquid medication injection unit 2300 may be configured to reflect blood glucose information measured by the blood glucose measuring unit 2100 and inject a second liquid medication containing ingredients for controlling an increase in a user's blood glucose to the user.

For example, the second liquid medication injected to a user through the second liquid medication injection unit 2300 may contain glucagon.

According to an optional embodiment, the second liquid medication injection unit 2300 may include a storage unit (not shown) for storing the second liquid medication.

In an embodiment, according to an optional embodiment, the second liquid medication injection unit 2300 may include a module for injecting the second liquid medication to a user (e.g., a needle module (not shown)), and the second liquid medication may be easily injected through the skin of the user through the needle module.

According to an optional embodiment, the second liquid medication injection unit 2300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 2300 may inject the second liquid medication once, a plurality of number of times, or continuously as needed by using blood glucose information from the blood glucose measuring unit 2100.

According to an optional embodiment, the blood glucose measuring unit 2100 and the second liquid medication injection unit 2300 may each include the communication unit NW to transmit information via a wire or wirelessly.

According to an optional embodiment, through a controller (not shown), when a blood glucose level measured by the blood glucose measuring unit 2100 is less than the lower limit of a set range, the second liquid medication may be injected by the second liquid medication injection unit 2300. For example, the driving unit may be controlled to control injection of a liquid medication to the needle module.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the liquid medication control injection device may be formed, such that the housing accommodates therein at least one region or the entire region of each of the blood glucose measuring unit, the first liquid medication injection unit, and the second liquid medication injection unit. For example, a cover included in the housing may cover the blood glucose measuring unit, the first liquid medication injection unit, or the second liquid medication injection unit.

In an embodiment, the blood glucose measuring unit, the first liquid medication injection unit, and the second liquid medication injection unit may be integrated through one housing, thereby improving convenience of handling and management of the blood glucose measuring unit, the first liquid medication injection unit, and the second liquid medication injection unit.

Through the liquid medication control injection device of the present embodiment, it is possible to increase user convenience and precisely control the injection of the first liquid medication and injection of the second liquid medication, thereby precisely controlling the blood glucose of a user.

Figure 5:
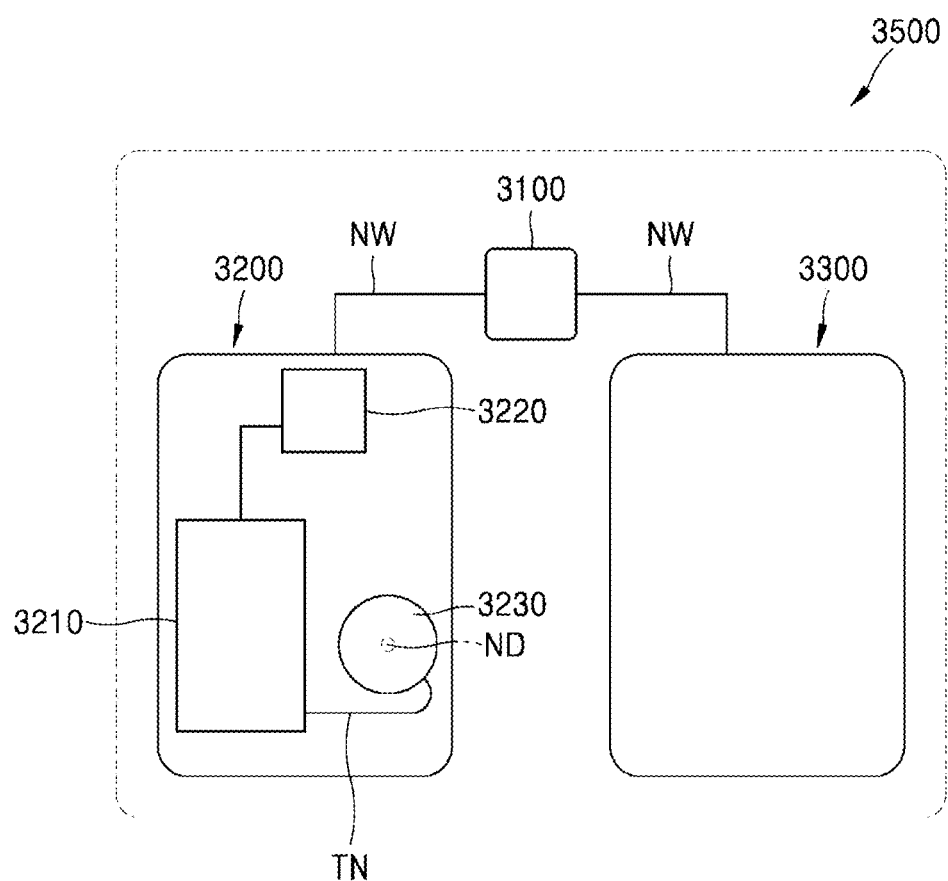
FIG. 5 is a schematic view for describing a liquid medication control injection device according to another embodiment of the present disclosure.

FIG. 5 is a schematic view for describing a liquid medication control injection device according to another embodiment of the present disclosure.

Referring to FIG. 5, a liquid medication injection device 3500 of the present embodiment may include a blood glucose measuring unit 3100, a first liquid medication injection unit 3200, and a second liquid medication injection unit 3300.

In an embodiment, although not shown, according to an optional embodiment, the liquid medication injection device 3500 of the present embodiment may further include a housing (not shown) like that described in the above embodiment.

The blood glucose measuring unit 3100 may be configured to measure a user's blood glucose sequentially at least a plurality of number of times.

According to an optional embodiment, the blood glucose measuring unit 3100 may continuously measure a user's blood glucose periodically or at irregular intervals for at least a set period of time and may include, for example, a continuous glucose monitoring (CGM).

The first liquid medication injection unit 3200 may be configured to reflect blood glucose information measured by the blood glucose measuring unit 3100 and inject a first liquid medication containing ingredients for controlling a decrease in a user's blood glucose to the user.

For example, the first liquid medication injected to a user through the first liquid medication injection unit 3200 may contain insulin.

According to an optional embodiment, the first liquid medication injection unit 3200 may include a storage unit 3210 for storing the first liquid medication.

The storage unit 3210 includes one or more outer portions 3211, and the first liquid medication may be stored in an inner space formed inside the outer portions 3211.

The storage unit 3210 may include a storage space in the form of a tank to store the liquid medication. The storage unit 3210 may include a waterproof material capable of storing a liquid medication, e.g., a plastic-based material, or may include various other materials. For example, the storage unit 3210 may include glass, a metal or a silicon material.

In an embodiment, although not shown, the storage unit 3210 may include one or more moving members (not shown) in the space for storing the liquid medication therein inside of the outer portions 3211. The moving members may allow the first liquid medication to move effectively. Specifically, the moving members may facilitate transmission of a liquid medication stored in the storage unit 3210 to a needle module 3230 described later.

In an embodiment, according to an optional embodiment, the first liquid medication injection unit 3200 may include a module for injecting the first liquid medication to a user, e.g., the needle module 3230.

The needle module 3230 may include at least one needle ND. The needle ND has a hollow interior, and the first liquid medication of the storage unit 3210 may be injected to a target of injection through the hollow interior.

A connection unit TN may be disposed between the needle module 3230 and the storage unit 3210. The connection unit TN may include a transfer region to transfer at least the first liquid medication of the storage unit 3210 to the needle module 3230 and may have, for example, a hollow tube-like shape.

The connection unit TN may be formed in various shapes. For example, the connection unit TN may have a flexible tube-like shape.

The first liquid medication may be easily injected through a user's skin through the needle module 3230.

According to an optional embodiment, the first liquid medication injection unit 3200 may include a driving unit 3220 for transferring the first liquid medication from the storage unit 3210 to the needle module 3230.

The driving unit 3220 may transfer the first liquid medication stored in the storage unit 3210 to the needle module 3230 and facilitate injection of the first liquid medication from the needle module 3230 into a target of injection, e.g., through the skin of a person.

According to an optional embodiment, the driving unit 3220 may include a pump, and a certain amount of the first liquid medication stored in the storage unit 3210 may be transferred toward the needle module 3230 through the pumping of the pump.

Although not shown, the driving unit 3220 may be connected to a power supply (not shown), and the power supply may be in one of various forms, e.g., an external power supply, a disposable battery, or a rechargeable battery.

In an embodiment, according to an optional embodiment, the driving unit 3220 may be electrically connected to a controller (not shown), and the driving unit 3220 may control the injection of the first liquid medication through the control of the controller.

As the driving unit 3220, all types of pumps capable of absorbing and discharging a liquid medication by using electricity may be used. For example, all types of pumps such as a mechanical displacement type micro-pump and an electromagnetic motion type micro-pump may be used as the driving unit 3220. The mechanical displacement micro-pump is a pump that uses the motion of a solid like a gear or a diagram or a fluid to generate a pressure difference to induce a flow of a fluid and may include a diaphragm displacement pump, a fluid displacement pump, a rotary pump, etc. The electromagnetic motion micro-pump is a pump that directly uses electrical or magnetic energy to move a fluid and may include an electro-hydrodynamic pump (EHD), an electro-osmotic pump, a magneto-hydrodynamic pump, a magneto hydrodynamic pump, an electro-wetting pump, etc.

The driving unit 3220 of the present embodiment may be connected to the storage unit 3210 to facilitate transfer of the first liquid medication stored in the storage unit 3210 to the needle module 3230 through the connection unit TN.

The first liquid medication injection unit 3200 may inject the first liquid medication once, a plurality of number of times, or continuously as needed by using blood glucose information from the blood glucose measuring unit 3100.

According to an optional embodiment, the blood glucose measuring unit 3100 and the first liquid medication injection unit 3200 may each include a communication unit NW to be connected to each other to transmit information via a wire or wirelessly.

According to an optional embodiment, through a controller (not shown), when a blood glucose level measured by the blood glucose measuring unit 3100 exceeds a set range, the first liquid medication may be injected by the first liquid medication injection unit 3200. For example, the driving unit 3220 may be controlled through the controller (not shown) to control injection of a liquid medication to the needle module 3230.

The controller (not shown) may be included in the blood glucose measuring unit 3100 and may be included in the first liquid medication injection unit 3200 or the second liquid medication injection unit 3300.

In an embodiment, the controller (not shown) may be provided as a separate member.

According to an optional embodiment, the controller notifies a value measured by the blood glucose measuring unit 3100 to a user, and the user may manipulate the controller to control the injection of the first liquid medication injection unit 3200 or the second liquid medication injection unit 3300.

Figure 6:
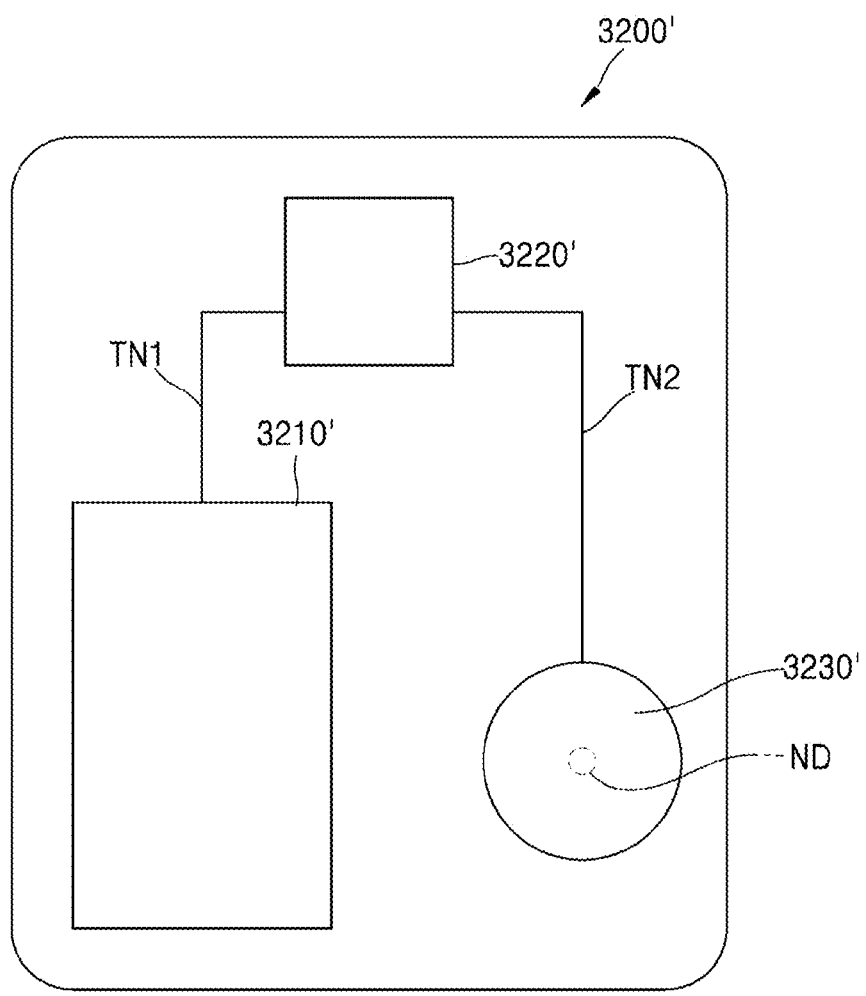
FIG. 6 is a view of a modified example of the first liquid medication injection unit of FIG. 5.

FIG. 6 is a view of a modified example of the first liquid medication injection unit of FIG. 5.

Referring to FIG. 6, a first liquid medication injection unit 3200' may include a storage unit 3210', a driving unit 3220', and a needle module 3230'.

A first connection unit TN1 may be disposed between the storage unit 3210' and the driving unit 3220'. The first connection unit TN1 may include a transfer region to transfer at least a first liquid medication of the storage unit 3210' toward the driving unit 3220' and may have, for example, a hollow tube-like shape. The first connection unit TN1 may be formed in various shapes. For example, the connection unit TN may have a flexible tube-like shape.

A second connection unit TN2 may be disposed between the driving unit 3220' and the needle module 3230'. The second connection unit TN2 may include a transfer region to transfer at least the first liquid medication from the driving unit 3220' toward the needle module 3230' and may have, for example, a hollow tube-like shape. The second connection unit TN2 may be formed in various shapes. For example, the connection unit TN may have a flexible tube-like shape.

The second liquid medication injection unit 3300 may be configured to reflect blood glucose information measured by the blood glucose measuring unit 3100 and inject a second liquid medication containing ingredients for controlling an increase in a user's blood glucose to the user.

For example, the second liquid medication injected to a user through the second liquid medication injection unit 3300 may contain glucagon.

According to an optional embodiment, the second liquid medication injection unit 3300 may include a storage unit (not shown) for storing the second liquid medication.

In an embodiment, according to an optional embodiment, the second liquid medication injection unit 3300 may include a module for injecting the second liquid medication to a user (e.g., a needle module (not shown)), and the second liquid medication may be easily injected through the skin of the user through the needle module.

According to an optional embodiment, the second liquid medication injection unit 3300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 3300 may inject the second liquid medication once, a plurality of number of times, or continuously as needed by using blood glucose information from the blood glucose measuring unit 3100.

According to an optional embodiment, the blood glucose measuring unit 3100 and the second liquid medication injection unit 3300 may each include the communication unit NW to transmit information via a wire or wirelessly.

According to an optional embodiment, through a controller (not shown), when a blood glucose level measured by the blood glucose measuring unit 3100 is less than the lower limit of a set range, the second liquid medication may be injected by the second liquid medication injection unit 3300. For example, the driving unit may be controlled to control injection of a liquid medication to the needle module.

Although not shown, the second liquid medication injection unit 3300 may include all or some of the same components as the driving unit, the storage unit, and the needle module included in the first liquid medication injection unit 3200. In an embodiment, the second liquid medication injection unit 3300 may include all or some of the same components as those of the modified example of FIG. 6.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication, a needle module formed to inject the liquid medication into a target of injection, and a driving unit for driving the movement of the liquid medication. The configuration may facilitate smooth injection of the first liquid medication or the second liquid medication.

As a result, through the liquid medication control injection device of the present embodiment, it is possible to increase user convenience and precisely control the injection of the first liquid medication and injection of the second liquid medication, thereby precisely controlling the blood glucose of a user.

Figure 7:
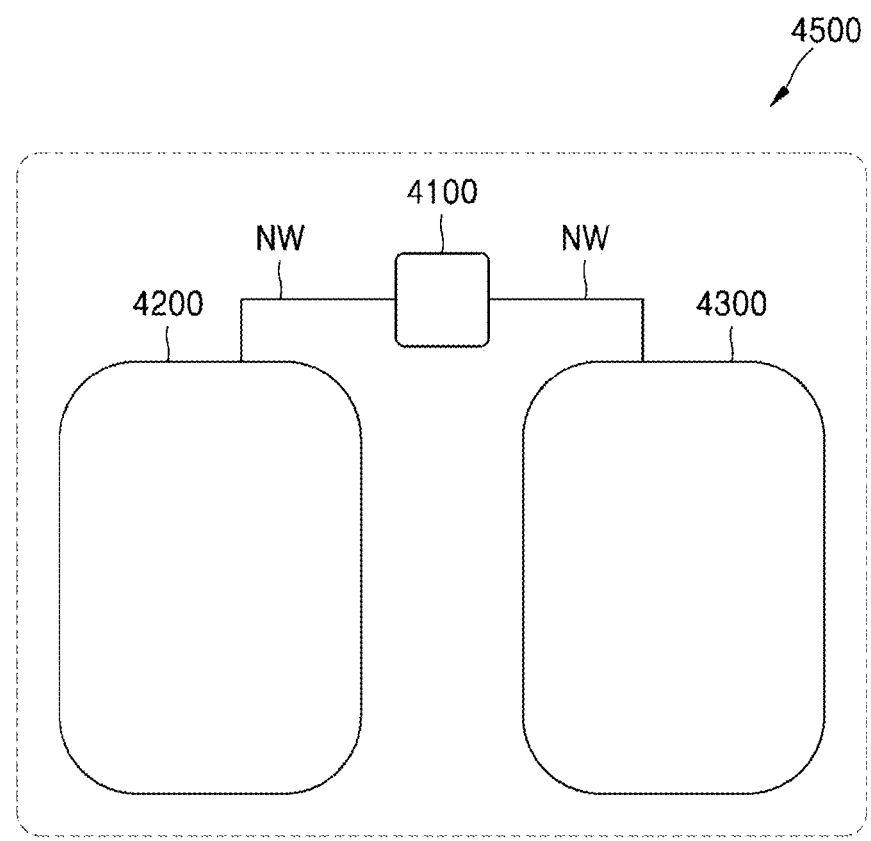
FIG. 7 is a schematic view for describing a liquid medication control injection device according to another embodiment of the present disclosure.
Figure 8:
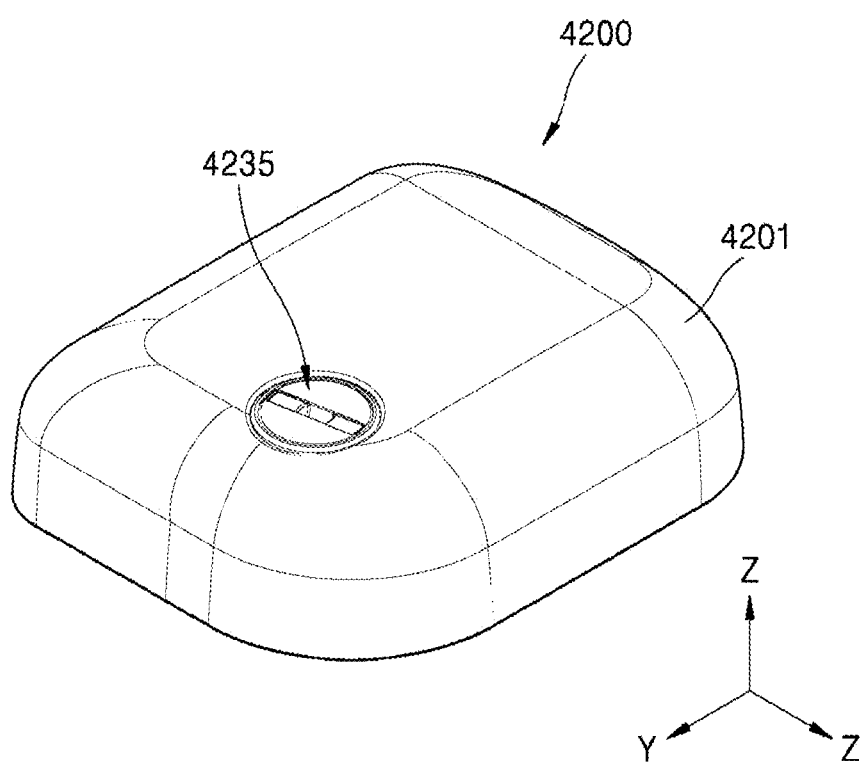
FIG. 8 is a perspective view of an example of the first liquid medication injection unit of FIG. 7.
Figure 9:
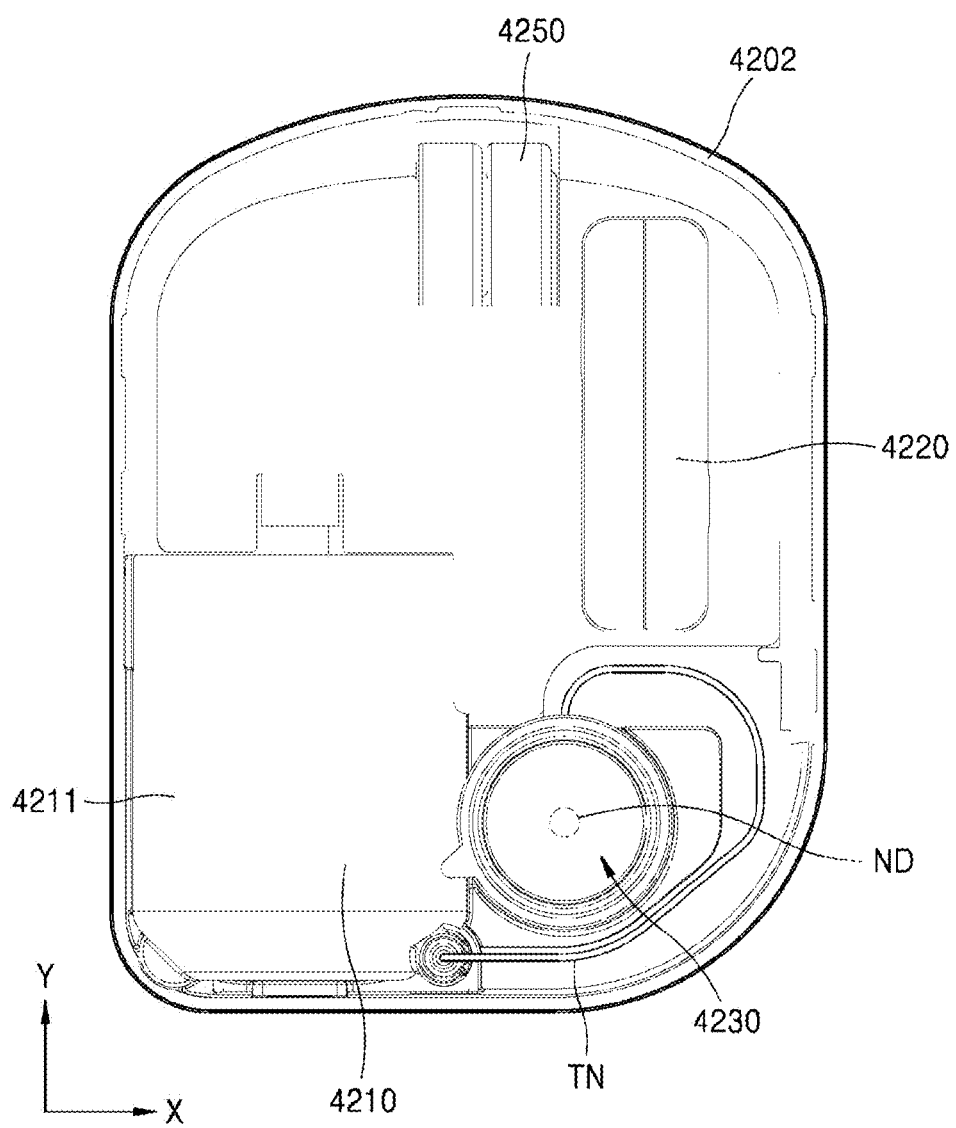
FIG. 9 is a schematic plan view of the first liquid medication injection unit of FIG. 8.

FIG. 7 is a schematic view for describing a liquid medication control injection device according to another embodiment of the present disclosure, FIG. 8 is a perspective view of an example of the first liquid medication injection unit of FIG. 7, and FIG. 9 is a schematic plan view of the first liquid medication injection unit of FIG. 8.

Referring to FIGS. 7 to 9, a liquid medication injection device 4500 of the present embodiment may include a blood glucose measuring unit 4100, a first liquid medication injection unit 4200, and a second liquid medication injection unit 4300.

In an embodiment, although not shown, according to an optional embodiment, the liquid medication injection device 4500 of the present embodiment may further include a housing (not shown) like that described in the above embodiment.

The blood glucose measuring unit 4100 may be configured to measure a user's blood glucose sequentially at least a plurality of number of times.

According to an optional embodiment, the blood glucose measuring unit 4100 may continuously measure a user's blood glucose periodically or at irregular intervals for at least a set period of time and may include, for example, a continuous glucose monitoring (CGM).

The first liquid medication injection unit 4200 may include a cover 4201, and the cover 4201 may be formed to cover a storage unit 4210, a driving unit 4220, and a needle module 4230.

For convenience of explanation, FIG. 9 shows a state in which the cover 4201 of FIG. 8 is removed.

The first liquid medication injection unit 4200 may include a base 4202, and the base 4202 may be formed to face the cover 4201.

According to an optional embodiment, the cover 4201 and the base 4202 may be connected to each other and become a housing of the first liquid medication injection unit 4200.

According to an optional embodiment, the cover 4201 may include an opening, a button 4235 may be disposed in correspondence to the opening, and the button 4235 may correspond to the needle module 4230.

For example, the button 4235 may be disposed over the needle module 4230, and the button 4235 may be formed, such that a user may press or rotate the button 4235. The button 4235 enables the movement with respect to the needle module 4230.

The first liquid medication injection unit 4200 may be configured to reflect blood glucose information measured by the blood glucose measuring unit 4100 and inject a first liquid medication containing ingredients for controlling a decrease in a user's blood glucose to the user.

For example, the first liquid medication injected to a user through the first liquid medication injection unit 4200 may contain insulin.

According to an optional embodiment, the first liquid medication injection unit 4200 may include the storage unit 4210 for storing the first liquid medication.

The storage unit 4210 includes one or more outer portions 4211, and the first liquid medication may be stored in an inner space formed inside the outer portions 4211.

The storage unit 4210 may include a storage space in the form of a tank to store the liquid medication. The storage unit 4210 may include a waterproof material capable of storing a liquid medication, e.g., a plastic-based material, or may include various other materials. For example, the storage unit 4210 may include glass, a metal or a silicon material.

In an embodiment, although not shown, the storage unit 4210 may include one or more moving members (not shown) in the space for storing the liquid medication therein inside of the outer portions 4211. The moving members may allow the first liquid medication to move effectively. Specifically, the moving members may facilitate transmission of a liquid medication stored in the storage unit 4210 to a needle module 4230 described later.

In an embodiment, although not shown, the storage unit 4210 may include a charging passage (not shown) and may receive a liquid medication through the charging passage.

In an embodiment, according to an optional embodiment, the first liquid medication injection unit 4200 may include a module for injecting the first liquid medication to a user, e.g., the needle module 4230.

The needle module 4230 may include at least one needle ND. The needle ND has a hollow shape through which an empty space is formed, and the first liquid medication of the storage unit 4210 may be injected to a target of injection through the empty space.

A connection unit TN may be disposed between the needle module 4230 and the storage unit 4210. The connection unit TN may include a transfer region to transfer at least the first liquid medication of the storage unit 4210 to the needle module 4230 and may have, for example, a hollow tube-like shape.

The connection unit TN may be formed in various shapes. For example, the connection unit TN may have a flexible tube-like shape.

The first liquid medication may be easily injected through a user's skin through the needle module 4230.

According to an optional embodiment, the first liquid medication injection unit 4200 may include a driving unit 4220 for transferring the first liquid medication from the storage unit 4210 to the needle module 4230.

The driving unit 4220 may transfer the first liquid medication stored in the storage unit 4210 to the needle module 4230 and facilitate injection of the first liquid medication from the needle module 4230 into a target of injection, e.g., through the skin of a person.

According to an optional embodiment, the driving unit 4220 may include a pump, and a certain amount of the first liquid medication stored in the storage unit 4210 may be transferred toward the needle module 4230 through the pumping of the pump.

The driving unit 4220 may be connected to a power supply 4250, wherein the power supply 4250 may include a battery of various types such as a disposable battery or a rechargeable battery.

In an embodiment, according to an optional embodiment, the driving unit 4220 may be electrically connected to a controller (not shown), and the driving unit 4220 may control the injection of the first liquid medication through the control of the controller.

As the driving unit 4220, all types of pumps capable of absorbing and discharging a liquid medication by using electricity may be used. For example, all types of pumps such as a mechanical displacement type micro-pump and an electromagnetic motion type micro-pump may be used as the driving unit 3220. The mechanical displacement micro-pump is a pump that uses the motion of a solid like a gear or a diagram or a fluid to generate a pressure difference to induce a flow of a fluid and may include a diaphragm displacement pump, a fluid displacement pump, a rotary pump, etc. The electromagnetic motion micro-pump is a pump that directly uses electrical or magnetic energy to move a fluid and may include an electro-hydrodynamic pump (EHD), an electro-osmotic pump, a magneto-hydrodynamic pump, a magneto hydrodynamic pump, an electro-wetting pump, etc.

The driving unit 4220 of the present embodiment may be connected to the storage unit 4210 to facilitate transfer of the first liquid medication stored in the storage unit 4210 to the needle module 4230 through the connection unit TN.

The first liquid medication injection unit 4200 may inject the first liquid medication once, a plurality of number of times, or continuously as needed by using blood glucose information from the blood glucose measuring unit 4100.

According to an optional embodiment, the blood glucose measuring unit 4100 and the first liquid medication injection unit 4200 may each include a communication unit NW to be connected to each other to transmit information via a wire or wirelessly.

According to an optional embodiment, through a controller (not shown), when a blood glucose level measured by the blood glucose measuring unit 4100 exceeds a set range, the first liquid medication may be injected by the first liquid medication injection unit 4200. For example, the driving unit 4220 may be controlled through the controller (not shown) to control injection of a liquid medication to the needle module 4230.

The controller (not shown) may be included in the blood glucose measuring unit 4100 and may be included in the first liquid medication injection unit 4200 or the second liquid medication injection unit 4300.

In an embodiment, the controller (not shown) may be provided as a separate member.

According to an optional embodiment, the controller notifies a value measured by the blood glucose measuring unit 4100 to a user, and the user may manipulate the controller to control the injection of the first liquid medication injection unit 4200 or the second liquid medication injection unit 4300.

The second liquid medication injection unit 4300 may be configured to reflect blood glucose information measured by the blood glucose measuring unit 4100 and inject a second liquid medication containing ingredients for controlling an increase in a user's blood glucose to the user.

For example, the second liquid medication injected to a user through the second liquid medication injection unit 4300 may contain glucagon.

According to an optional embodiment, the second liquid medication injection unit 4300 may include a storage unit (not shown) for storing the second liquid medication.

In an embodiment, according to an optional embodiment, the second liquid medication injection unit 4300 may include a module for injecting the second liquid medication to a user (e.g., a needle module (not shown)), and the second liquid medication may be easily injected through the skin of the user through the needle module.

According to an optional embodiment, the second liquid medication injection unit 4300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 4300 may inject the second liquid medication once, a plurality of number of times, or continuously as needed by using blood glucose information from the blood glucose measuring unit 4100.

According to an optional embodiment, the blood glucose measuring unit 4100 and the second liquid medication injection unit 4300 may each include the communication unit NW to transmit information via a wire or wirelessly.

According to an optional embodiment, through a controller (not shown), when a blood glucose level measured by the blood glucose measuring unit 4100 is less than a set range, the second liquid medication may be injected by the second liquid medication injection unit 4300. For example, the driving unit may be controlled to control injection of a liquid medication to the needle module.

Although not shown, the second liquid medication injection unit 4300 may include all or some of the same components as the driving unit, the storage unit, and the needle module included in the first liquid medication injection unit 4200.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication, a needle module formed to inject the liquid medication into a target of injection, and a driving unit for driving the movement of the liquid medication. The configuration may facilitate smooth injection of the first liquid medication or the second liquid medication. In an embodiment, energy for driving the driving unit may be easily supplied to the driving unit through the power supply, and thus the operation of the liquid medication control injection device may be smoothly maintained.

As a result, through the liquid medication control injection device of the present embodiment, it is possible to increase user convenience and precisely control the injection of the first liquid medication and injection of the second liquid medication, thereby precisely controlling the blood glucose of a user.

Figure 10:
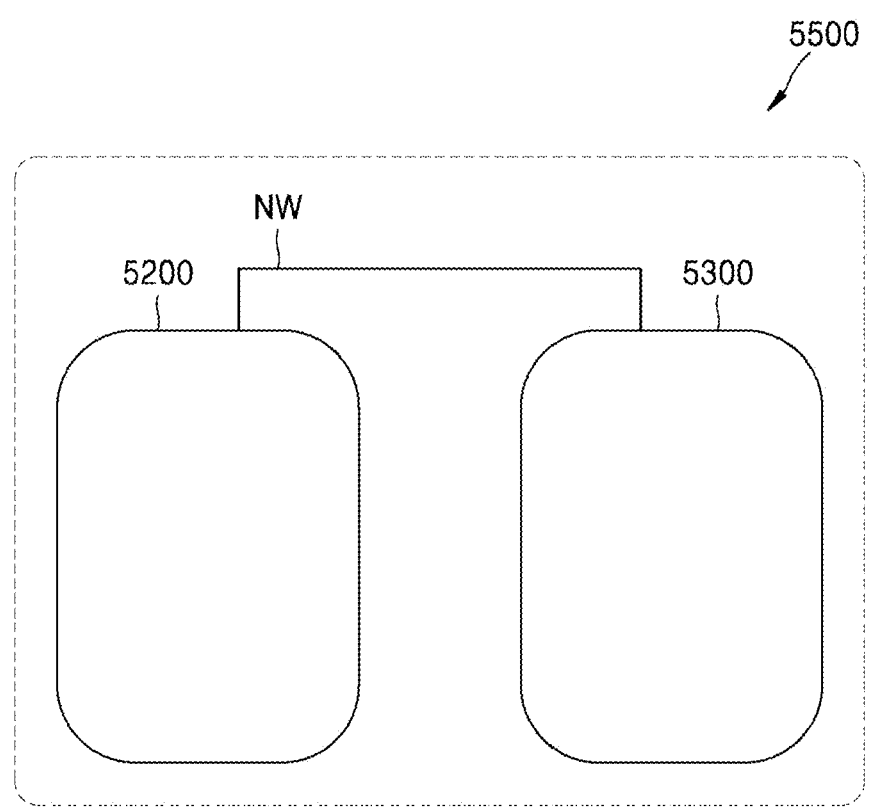
FIG. 10 is a schematic view for describing a liquid medication control injection device according to another embodiment of the present disclosure.
Figure 11:
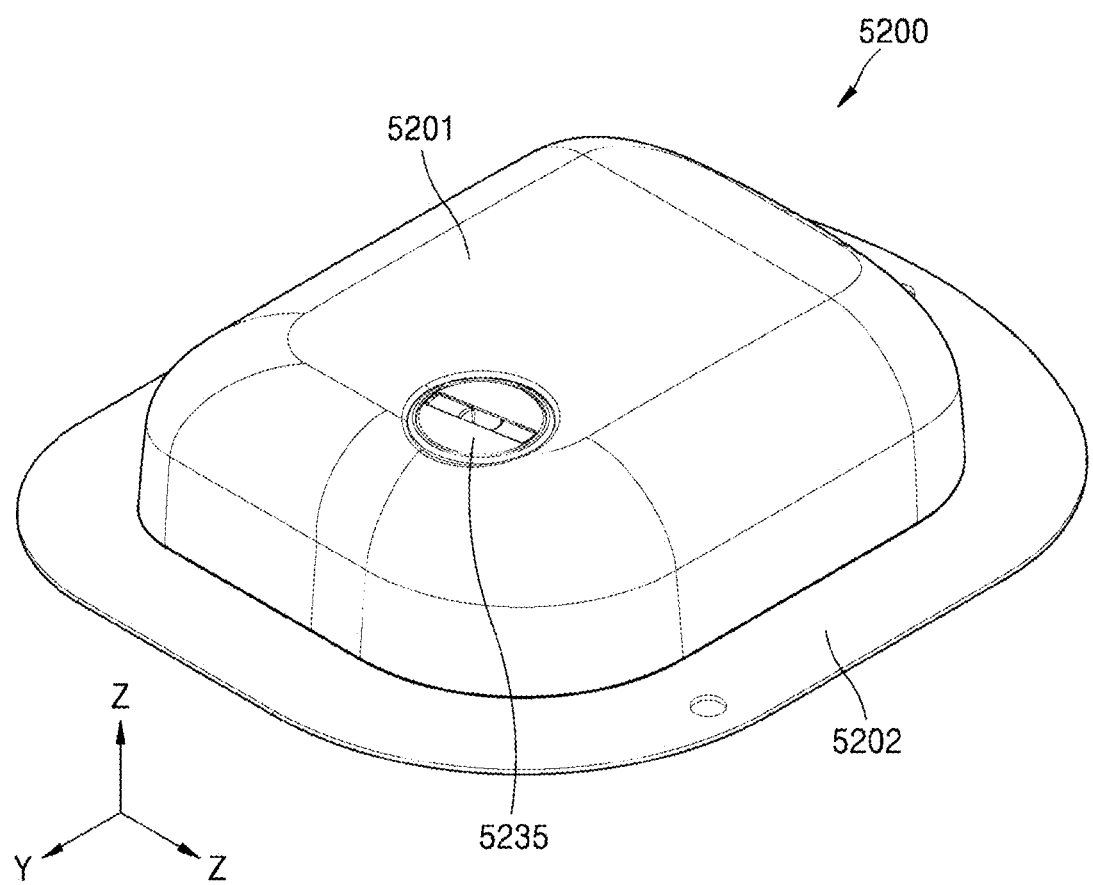
FIG. 11 is a perspective view of an example of the first liquid medication injection unit of FIG. 10.
Figure 12:
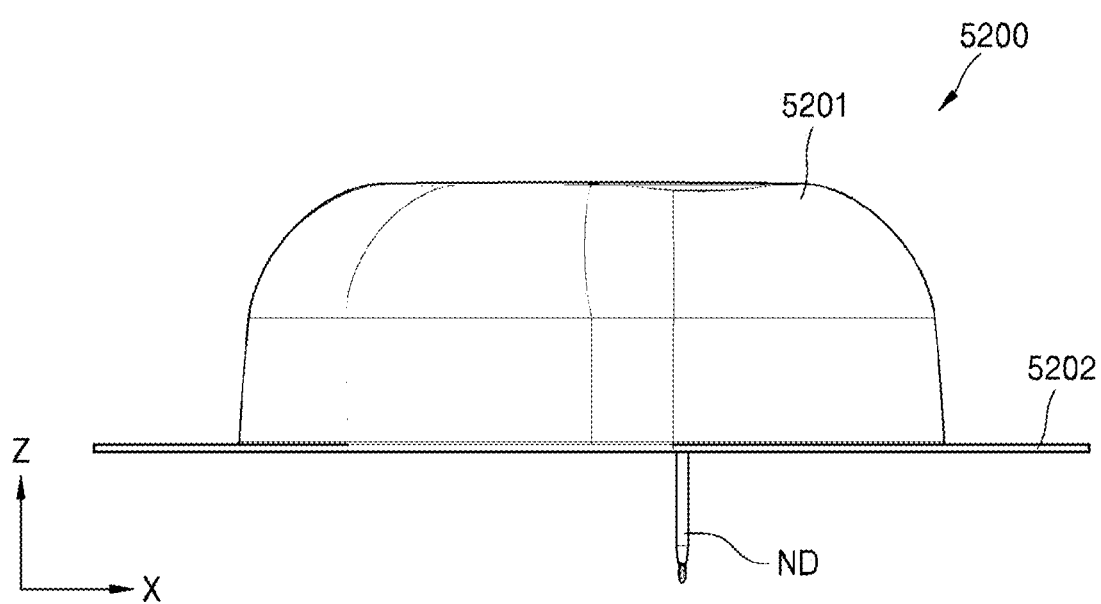
FIG. 12 is a schematic front view of the first liquid medication injection unit of FIG. 11.
Figure 13:
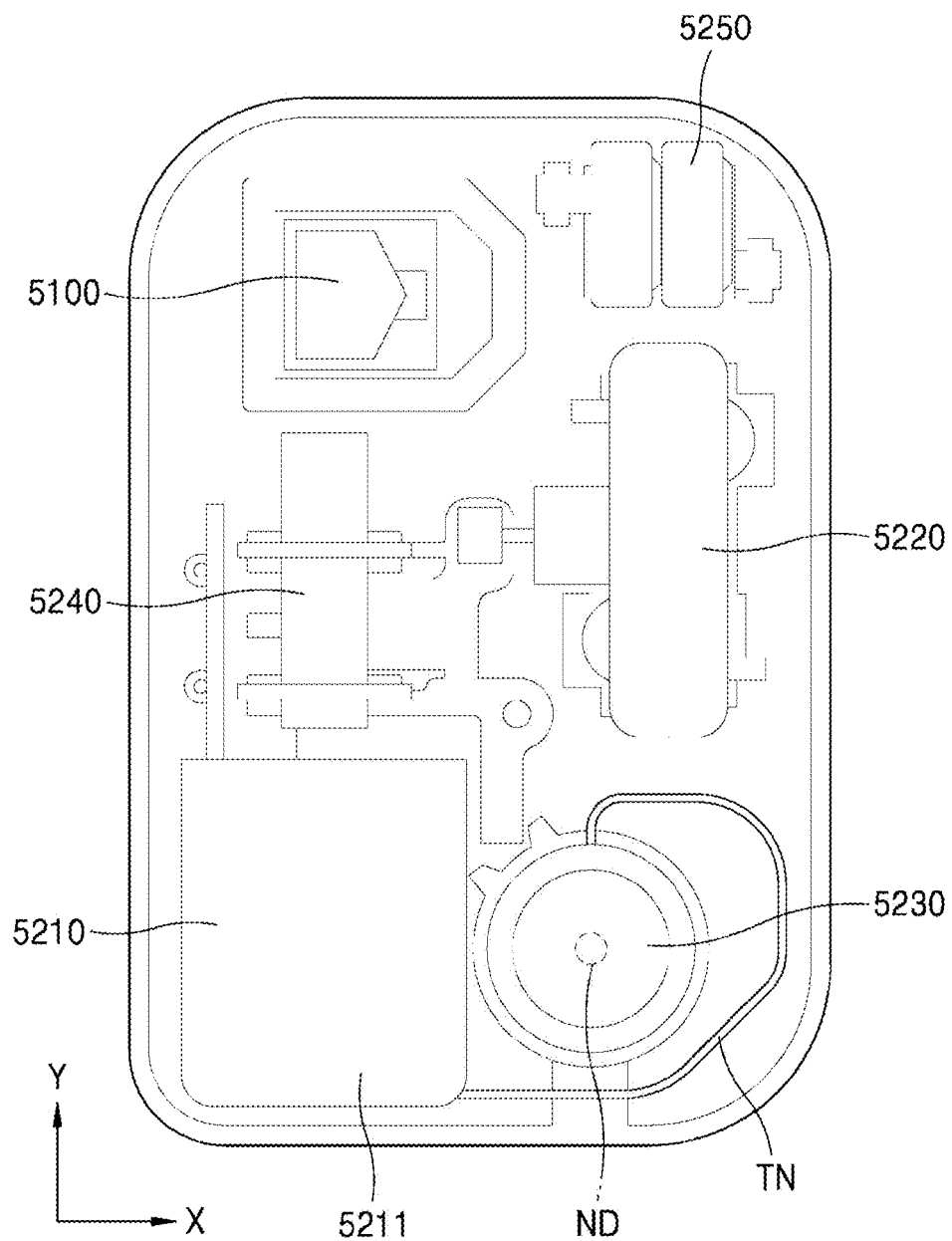
FIG. 13 is a schematic plan view of the first liquid medication injection unit of FIG. 11.

FIG. 10 is a schematic view for describing a liquid medication control injection device according to another embodiment of the present disclosure, FIG. 11 is a perspective view of an example of the first liquid medication injection unit of FIG. 10, FIG. 12 is a schematic front view of the first liquid medication injection unit of FIG. 11, and FIG. 13 is a schematic plan view of the first liquid medication injection unit of FIG. 11.

Referring to FIGS. 10 to 13, a liquid medication injection device 5500 of the present embodiment may include a blood glucose measuring unit 5100, a first liquid medication injection unit 5200, and a second liquid medication injection unit 5300.

In an embodiment, although not shown, according to an optional embodiment, the liquid medication injection device 5500 of the present embodiment may further include a housing (not shown) like that described in the above embodiment.

The blood glucose measuring unit 5100 may be configured to measure a user's blood glucose sequentially at least a plurality of number of times.

According to an optional embodiment, the blood glucose measuring unit 5100 may continuously measure a user's blood glucose periodically or at irregular intervals for at least a set period of time and may include, for example, a continuous glucose monitoring (CGM).

The blood glucose measuring unit 5100 may be formed to be included in the first liquid medication injection unit 5200 as shown in FIG. 13. For example, the blood glucose measuring unit 5100 may be formed inside a housing of the first liquid medication injection unit 5200 to be covered by a cover 5201.

The first liquid medication injection unit 5200 may include the cover 5201, and the cover 5201 may be formed to cover a storage unit 5210, a driving unit 5220, and a needle module 5230.

For convenience of explanation, FIG. 13 shows a state in which the cover 5201 of FIG. 11 is removed.

The first liquid medication injection unit 5200 may include a base 5202, and the base 5202 may be formed to face the cover 5201.

According to an optional embodiment, the cover 5201 and the base 5202 may be connected to each other and become the housing of the first liquid medication injection unit 5200.

According to an optional embodiment, the cover 5201 may include an opening, a button 5235 may be disposed in correspondence to the opening, and the button 5235 may correspond to the needle module 5230.

For example, the button 5235 may be disposed over the needle module 5230, and the button 5235 may be formed, such that a user may press or rotate the button 5235. The button 5235 enables the movement with respect to the needle module 5230.

The first liquid medication injection unit 5200 may be configured to reflect blood glucose information measured by the blood glucose measuring unit 5100 and inject a first liquid medication containing ingredients for controlling a decrease in a user's blood glucose to the user.

For example, the first liquid medication injected to a user through the first liquid medication injection unit 5200 may contain insulin.

According to an optional embodiment, the first liquid medication injection unit 5200 may include the storage unit 5210 for storing the first liquid medication.

The storage unit 5210 includes one or more outer portions 5211, and the first liquid medication may be stored in an inner space formed inside the outer portions 5211.

The storage unit 5210 may include a storage space in the form of a tank to store the liquid medication. The storage unit 5210 may include a waterproof material capable of storing a liquid medication, e.g., a plastic-based material, or may include various other materials. For example, the storage unit 5210 may include glass, a metal or a silicon material.

In an embodiment, although not shown, the storage unit 5210 may include one or more moving members (not shown) in the space for storing the liquid medication therein inside of the outer portions 5211. The moving members may allow the first liquid medication to move effectively. Specifically, the moving members may facilitate transmission of a liquid medication stored in the storage unit 5210 to a needle module 5230 described later.

In an embodiment, although not shown, the storage unit 5210 may include a charging passage (not shown) and may receive a liquid medication through the charging passage.

In an embodiment, according to an optional embodiment, the first liquid medication injection unit 5200 may include a module for injecting the first liquid medication to a user, e.g., the needle module 5230.

The needle module 5230 may include at least one needle ND. The needle ND has a hollow shape through which an empty space is formed, and the first liquid medication of the storage unit 5210 may be injected to a target of injection through the empty space.

A connection unit TN may be disposed between the needle module 5230 and the storage unit 5210. The connection unit TN may include a transfer region to transfer at least the first liquid medication of the storage unit 5210 to the needle module 5230 and may have, for example, a hollow tube-like shape.

The connection unit TN may be formed in various shapes. For example, the connection unit TN may have a flexible tube-like shape.

The first liquid medication may be easily injected through a user's skin through the needle module 5230.

According to an optional embodiment, the first liquid medication injection unit 5200 may include a driving unit 5220 for transferring the first liquid medication from the storage unit 5210 to the needle module 5230.

The driving unit 5220 may transfer the first liquid medication stored in the storage unit 5210 to the needle module 5230 and facilitate injection of the first liquid medication from the needle module 5230 into a target of injection, e.g., through the skin of a person.

According to an optional embodiment, the driving unit 5220 may include a pump, and a certain amount of the first liquid medication stored in the storage unit 5210 may be transferred toward the needle module 5230 through the pumping of the pump.

The driving unit 5220 may be connected to a power supply 5250, wherein the power supply 5250 may include a battery of various types such as a disposable battery or a rechargeable battery.

In an embodiment, according to an optional embodiment, the driving unit 5220 may be electrically connected to a controller (not shown), and the driving unit 5220 may control the injection of the first liquid medication through the control of the controller.

As the driving unit 5220, all types of pumps capable of absorbing and discharging a liquid medication by using electricity may be used. For example, all types of pumps such as a mechanical displacement type micro-pump and an electromagnetic motion type micro-pump may be used as the driving unit 3220. The mechanical displacement micro-pump is a pump that uses the motion of a solid like a gear or a diagram or a fluid to generate a pressure difference to induce a flow of a fluid and may include a diaphragm displacement pump, a fluid displacement pump, a rotary pump, etc. The electromagnetic motion micro-pump is a pump that directly uses electrical or magnetic energy to move a fluid and may include an electro-hydrodynamic pump (EHD), an electro-osmotic pump, a magneto-hydrodynamic pump, a magneto hydrodynamic pump, an electrowetting pump, etc.

The driving unit 5220 of the present embodiment may be connected to the storage unit 5210 to facilitate transfer of the first liquid medication stored in the storage unit 5210 to the needle module 5230 through the connection unit TN.

According to an optional embodiment, a driving connection unit 5240 may be disposed between the driving unit 5220 and the storage unit 5210.

The driving connection unit 5240 may receive a driving force from the driving unit 5220 and may transmit the driving force to a moving member (not shown) disposed inside the storage unit 5210. The moving member (not shown) inside the storage unit 5210 may be precisely controlled through the driving connection unit 5240, and thus supply of the first liquid medication of the storage unit 5210 to the needle module 5230 may be finely controlled.

For example, the driving connection unit 5240 may include one or more gear modules.

The first liquid medication injection unit 5200 may inject the first liquid medication once, a plurality of number of times, or continuously as needed by using blood glucose information from the blood glucose measuring unit 5100.

According to an optional embodiment, through a controller (not shown), when a blood glucose level measured by the blood glucose measuring unit 5100 exceeds a set range, the first liquid medication may be injected by the first liquid medication injection unit 5200. For example, the driving unit 5220 may be controlled through the controller (not shown) to control injection of a liquid medication to the needle module 5230.

The controller (not shown) may be included in the blood glucose measuring unit 5100 and may be included in the first liquid medication injection unit 5200 or the second liquid medication injection unit 5300.

In an embodiment, the controller (not shown) may be provided as a separate member.

According to an optional embodiment, the controller notifies a value measured by the blood glucose measuring unit 5100 to a user, and the user may manipulate the controller to control the injection of the first liquid medication injection unit 5200 or the second liquid medication injection unit 5300.

The second liquid medication injection unit 5300 may be configured to reflect blood glucose information measured by the blood glucose measuring unit 5100 and inject a second liquid medication containing ingredients for controlling an increase in a user's blood glucose to the user.

For example, the second liquid medication injected to a user through the second liquid medication injection unit 5300 may contain glucagon.

According to an optional embodiment, the second liquid medication injection unit 5300 may include a storage unit (not shown) for storing the second liquid medication.

In an embodiment, according to an optional embodiment, the second liquid medication injection unit 5300 may include a module for injecting the second liquid medication to a user (e.g., a needle module (not shown)), and the second liquid medication may be easily injected through the skin of the user through the needle module.

According to an optional embodiment, the second liquid medication injection unit 5300 may include a driving unit (not shown) for transferring the second liquid medication from the storage unit to the needle module. For example, the driving unit may include a pump, and a set amount of the second liquid medication may be injected to a user through the pumping of the pump.

The second liquid medication injection unit 5300 may inject the second liquid medication once, a plurality of number of times, or continuously as needed by using blood glucose information from the blood glucose measuring unit 5100.

According to an optional embodiment, the blood glucose measuring unit 5100 and the second liquid medication injection unit 5300 may each include the communication unit NW to transmit information via a wire or wirelessly.

According to an optional embodiment, through a controller (not shown), when a blood glucose level measured by the blood glucose measuring unit 5100 is less than the lower limit of a set range, the second liquid medication may be injected by the second liquid medication injection unit 5300. For example, the driving unit may be controlled to control injection of a liquid medication to the needle module.

Although not shown, the second liquid medication injection unit 5300 may include all or some of the same components as the driving unit, the storage unit, and the needle module included in the first liquid medication injection unit 5200.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication, a needle module formed to inject the liquid medication into a target of injection, and a driving unit for driving the movement of the liquid medication. The configuration may facilitate smooth injection of the first liquid medication or the second liquid medication. In an embodiment, energy for driving the driving unit may be easily supplied to the driving unit through the power supply, and thus the operation of the liquid medication control injection device may be smoothly maintained.

In an embodiment, the blood glucose measuring unit may be formed, such that the blood glucose measuring unit is included in the first liquid medication injection unit or at least one region of the blood glucose measuring unit is included in the first liquid medication injection unit. Therefore, convenience of handling and management of the blood glucose measuring unit, the first liquid medication injection unit, and the second liquid medication injection unit may be improved.

In an embodiment, although not shown, the blood glucose measuring unit may be formed, such that the blood glucose measuring unit is included in the second liquid medication injection unit or at least one region of the blood glucose measuring unit is included in the second liquid medication injection unit.

According to an optional embodiment, a driving connection unit connected to the driving unit may be included, and a moving member inside the storage unit may be precisely controlled through the driving connection unit. Therefore, fine supply amounts of the first liquid medication and the second liquid medication may be precisely controlled.

As a result, through the liquid medication control injection device of the present embodiment, it is possible to increase user convenience and precisely control the injection of the first liquid medication and injection of the second liquid medication, thereby precisely controlling the blood glucose of a user.

Figure 14:
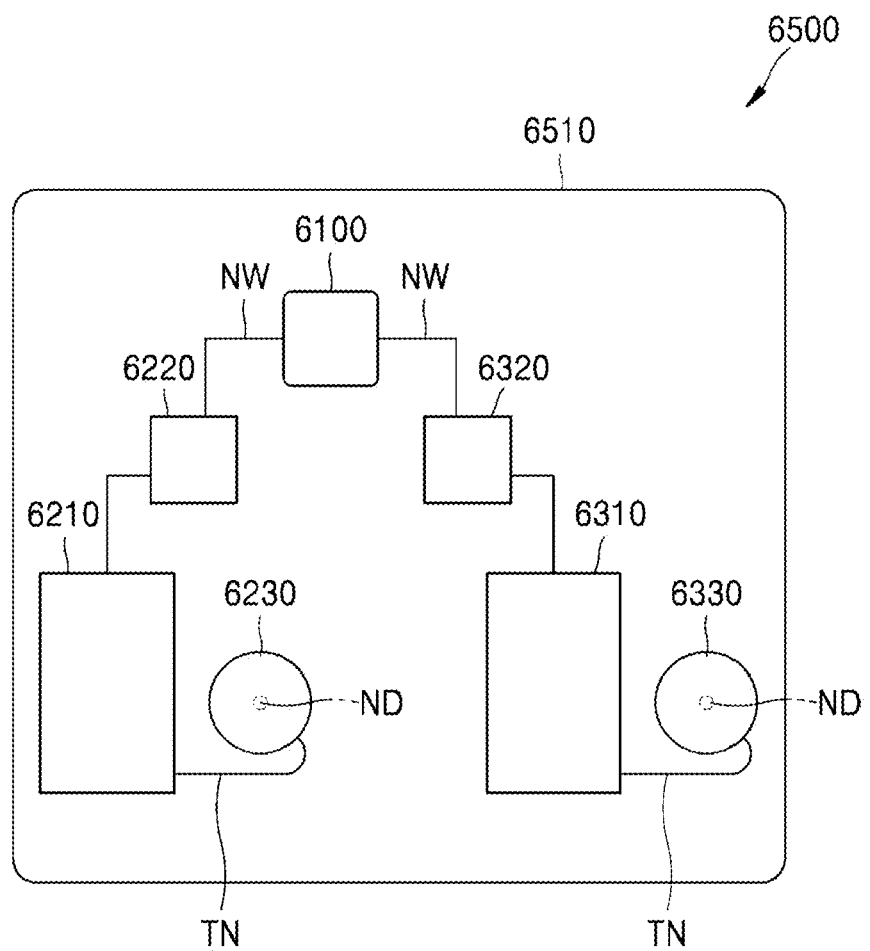
FIG. 14 is a schematic view for describing a liquid medication control injection device according to another embodiment of the present disclosure

FIG. 14 is a schematic view for describing a liquid medication control injection device according to another embodiment of the present disclosure.

Referring to FIG. 1, a liquid medication injection device 6500 of the present embodiment may include a blood glucose measuring unit 6100, a first liquid medication injection unit 6200, a second liquid medication injection unit 6300, and a housing 6510.

The housing 6510 may have an integrated shape, e.g., a box-like shape.

According to an optional embodiment, the housing 5510 may have a shape including a base and a detachable cover.

One region or the entire region of each of the blood glucose measuring unit 6100, the first liquid medication injection unit 6200, and the second liquid medication injection unit 6300 may be covered by the housing 6510.

For example, a cover (not shown) of the housing 6510 may have a shape that covers one region or the entire region of each of the blood glucose measuring unit 6100, the first liquid medication injection unit 6200, and the second liquid medication injection unit 6300.

The blood glucose measuring unit 6100 may be configured to measure a user's blood glucose sequentially at least a plurality of number of times.

According to an optional embodiment, the blood glucose measuring unit 6100 may continuously measure a user's blood glucose periodically or at irregular intervals for at least a set period of time and may include, for example, a continuous glucose monitoring (CGM).

The first liquid medication injection unit 6200 may include a first storage unit 6210, a first driving unit 6220, and a first needle module 6230.

The first liquid medication injection unit 6200 may be configured to reflect blood glucose information measured by the blood glucose measuring unit 6100 and inject a first liquid medication containing ingredients for controlling a decrease in a user's blood glucose to the user.

For example, the first liquid medication injected to a user through the first liquid medication injection unit 6200 may contain insulin.

According to an optional embodiment, the first liquid medication injection unit 6200 may include the first storage unit 6210 for storing the first liquid medication.

Any one of storage units described in the above embodiments may be selectively applied as the first storage unit 6210, and thus detailed descriptions thereof will be omitted.

In an embodiment, according to an optional embodiment, the first liquid medication injection unit 6200 may include a module for injecting the first liquid medication to a user, e.g., the first needle module 6230.

The first needle module 6230 may include at least one needle ND. The needle ND has a hollow shape through which an empty space is formed, and the first liquid medication of the first storage unit 6210 may be injected to a target of injection through the empty space.

Any one of needle modules described in the above embodiments may be selectively applied as the first needle module 6230, and thus detailed descriptions thereof will be omitted.

According to an optional embodiment, the first liquid medication injection unit 6200 may include the first driving unit 6220 for transferring the first liquid medication from the first storage unit 6210 to the first needle module 6230.

The first driving unit 6220 may be connected to a power supply (not shown).

Any one of driving units described in the above embodiments may be selectively applied as the first driving unit 6220, and thus detailed descriptions thereof will be omitted.

The first liquid medication injection unit 6200 may inject the first liquid medication once, a plurality of number of times, or continuously as needed by using blood glucose information from the blood glucose measuring unit 6100.

According to an optional embodiment, through a controller (not shown), when a blood glucose level measured by the blood glucose measuring unit 6100 exceeds a set range, the first liquid medication may be injected by the first liquid medication injection unit 6200. For example, the first driving unit 6220 may be controlled through the controller (not shown) to control injection of a liquid medication to the first needle module 6230.

The controller (not shown) may be included in the blood glucose measuring unit 6100 and may be included in the first liquid medication injection unit 6200 or the second liquid medication injection unit 6300.

In an embodiment, the controller (not shown) may be provided as a separate member.

According to an optional embodiment, the controller notifies a value measured by the blood glucose measuring unit 6100 to a user, and the user may manipulate the controller to control the injection of the first liquid medication injection unit 6200 or the second liquid medication injection unit 6300.

The second liquid medication injection unit 6300 may include a second storage unit 6310, a second driving unit 6320, and a second needle module 6330.

The second liquid medication injection unit 6300 may be configured to reflect blood glucose information measured by the blood glucose measuring unit 6100 and inject a second liquid medication containing ingredients for controlling an increase in a user's blood glucose to the user.

For example, the second liquid medication injected to a user through the second liquid medication injection unit 6300 may contain glucagon.

The second liquid medication injection unit 6300 may include the second storage unit 6310 for storing the second liquid medication.

In an embodiment, according to an optional embodiment, the second liquid medication injection unit 6300 may include a module for injecting the second liquid medication to a user (e.g., the second needle module 6330), and the second liquid medication may be easily injected through the skin of the user through the needle module (the second needle module 6330?).

According to an optional embodiment, the second liquid medication injection unit 6300 may include the second driving unit 6320 for transferring the second liquid medication from the second storage unit 6310 to the second needle module 6330.

The second liquid medication injection unit 6300 may inject the second liquid medication once, a plurality of number of times, or continuously as needed by using blood glucose information from the blood glucose measuring unit 6100.

According to an optional embodiment, the blood glucose measuring unit 6100 and the second liquid medication injection unit 6300 may each include a communication unit to transmit information via a wire or wirelessly.

According to an optional embodiment, through a controller (not shown), when a blood glucose level measured by the blood glucose measuring unit 6100 is less than the lower limit of a set range, the second liquid medication may be injected by the second liquid medication injection unit 6300. For example, the second driving unit 6320 may be controlled to control injection of a liquid medication to the second needle module 6330.

Although not shown, the second liquid medication injection unit 6300 may include all or some of the same components as the driving unit, the storage unit, and the needle module included in the first liquid medication injection unit 6200.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication, a needle module formed to inject the liquid medication into a target of injection, and a driving unit for driving the movement of the liquid medication. The configuration may facilitate smooth injection of the first liquid medication or the second liquid medication. In an embodiment, energy for driving the driving unit may be easily supplied to the driving unit through the power supply, and thus the operation of the liquid medication control injection device may be smoothly maintained.

In an embodiment, the blood glucose measuring unit, the first liquid medication injection unit, and the second liquid medication injection unit may be arranged inside the housing and, for example, at least one region of each of them may be covered by a cover of the housing. In an embodiment, as a specific example, the blood glucose measuring unit, the first liquid medication injection unit, and the second liquid medication injection unit may be integrated with one another. Therefore, convenience of handling and management of the liquid medication control injection device including the blood glucose measuring unit, the first liquid medication injection unit, and the second liquid medication injection unit may be improved.

As a result, through the liquid medication control injection device of the present embodiment, it is possible to increase user convenience and precisely control the injection of the first liquid medication and injection of the second liquid medication, thereby precisely controlling the blood glucose of a user.

FIG. 15 is a schematic view for describing a liquid medication control injection device according to another embodiment of the present disclosure.

A housing 7510 may have an integrated shape, e.g., a box-like shape.

According to an optional embodiment, the housing 7510 may have a shape including a base and a detachable cover.

One region or the entire region of each of a blood glucose measuring unit 7100, a first liquid medication injection unit 7200, and a second liquid medication injection unit 7300 may be covered by the housing 7510.

For example, a cover (not shown) of the housing 7510 may have a shape that covers one region or the entire region of each of the blood glucose measuring unit 7100, the first liquid medication injection unit 7200, and the second liquid medication injection unit 7300.

The blood glucose measuring unit 7100 may be configured to measure a user's blood glucose sequentially at least a plurality of number of times.

According to an optional embodiment, the blood glucose measuring unit 7100 may continuously measure a user's blood glucose periodically or at irregular intervals for at least a set period of time and may include, for example, a continuous glucose monitoring (CGM).

The first liquid medication injection unit 7200 may include a first storage unit 7210, a first driving unit 7220, and a common needle module 7530.

The first liquid medication injection unit 7200 may be configured to reflect blood glucose information measured by the blood glucose measuring unit 7100 and inject a first liquid medication containing ingredients for controlling a decrease in a user's blood glucose to the user.

For example, the first liquid medication injected to a user through the first liquid medication injection unit 7200 may contain insulin.

According to an optional embodiment, the first liquid medication injection unit 7200 may include the first storage unit 7210 for storing the first liquid medication.

Any one of storage units described in the above embodiments may be selectively applied as the first storage unit 7210, and thus detailed descriptions thereof will be omitted.

In an embodiment, according to an optional embodiment, the first liquid medication injection unit 7200 may include a module for injecting the first liquid medication to a user, e.g., the common needle module 7530.

The common needle module 7530 may include at least one needle ND. The needle ND has a hollow shape through which an empty space is formed, and the first liquid medication of the first storage unit 7210 may be injected to a target of injection through the empty space.

According to an optional embodiment, the first liquid medication injection unit 7200 may include the first driving unit 7220 for transferring the first liquid medication from the first storage unit 7210 to the common needle module 7530.

The first driving unit 7220 may be connected to a power supply (not shown).

Any one of driving units described in the above embodiments may be selectively applied as the first driving unit 7220, and thus detailed descriptions thereof will be omitted.

The first liquid medication injection unit 7200 may inject the first liquid medication once, a plurality of number of times, or continuously as needed by using blood glucose information from the blood glucose measuring unit 7100.

According to an optional embodiment, through a controller (not shown), when a blood glucose level measured by the blood glucose measuring unit 7100 exceeds a set range, the first liquid medication may be injected by the first liquid medication injection unit 7200. For example, the first driving unit 7220 may be controlled through the controller (not shown) to control injection of a liquid medication to the common needle module 7530.

The controller (not shown) may be included in the blood glucose measuring unit 7100 and may be included in the first liquid medication injection unit 7200 or the second liquid medication injection unit 7300.

In an embodiment, the controller (not shown) may be provided as a separate member.

According to an optional embodiment, the controller notifies a value measured by the blood glucose measuring unit 7100 to a user, and the user may manipulate the controller to control the injection of the first liquid medication injection unit 7200 or the second liquid medication injection unit 7300.

The second liquid medication injection unit 7300 may include a second storage unit 7310, a second driving unit 7320, and the common needle module 7530.

The second liquid medication injection unit 7300 may be configured to reflect blood glucose information measured by the blood glucose measuring unit 7100 and inject a second liquid medication containing ingredients for controlling an increase in a user's blood glucose to the user.

For example, the second liquid medication injected to a user through the second liquid medication injection unit 7300 may contain glucagon.

The second liquid medication injection unit 7300 may include the second storage unit 7310 for storing the second liquid medication.

In an embodiment, according to an optional embodiment, the second liquid medication injection unit 7300 may include a module for injecting the second liquid medication to a user (e.g., the common needle module 7530), and the second liquid medication may be easily injected through the skin of the user through the common needle module 7530.

According to an optional embodiment, the second liquid medication injection unit 7300 may include the second driving unit 7320 for transferring the second liquid medication from the second storage unit 7310 to the common needle module 7530.

The second liquid medication injection unit 7300 may inject the second liquid medication once, a plurality of number of times, or continuously as needed by using blood glucose information from the blood glucose measuring unit 7100.

According to an optional embodiment, the blood glucose measuring unit 7100 and the second liquid medication injection unit 7300 may each include a communication unit to transmit information via a wire or wirelessly.

According to an optional embodiment, through a controller (not shown), when a blood glucose level measured by the blood glucose measuring unit 7100 is less than the lower limit of a set range, the second liquid medication may be injected by the second liquid medication injection unit 7300. For example, the second driving unit 7320 may be controlled to control injection of a liquid medication to the common needle module 7530.

Although not shown, the second liquid medication injection unit 7300 may include all or some of the same components as the driving unit, the storage unit, and the needle module included in the first liquid medication injection unit 7200.

The present embodiment includes the common needle module 7530 for injection of the first liquid medication and injection of the second liquid medication.

The common needle module 7530 is connected to the first storage unit 7210 in which the first liquid medication is stored and the second storage unit 7310 in which the second liquid medication is stored, and thus the common needle module 7530 may selectively receive the first liquid medication and the second liquid medication. For example, the common needle module 7530 may selectively receive the first liquid medication from the first storage unit 7210 or the second liquid medication from the second storage unit 7310 through a valve VL.

Therefore, it is possible to selectively and easily inject a desired liquid medication from between the first liquid medication and the second liquid medication to a target of injection through the common needle module 7530.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication and a driving unit for driving the movement of the liquid medication. Therefore, the operation of the liquid medication control injection device may be smoothly maintained.

On the other hand, the liquid medication control injection device may include a common needle module formed to inject a liquid medication into a target of injection, and the common needle module may be connected to a first storage unit for storing a first liquid medication and a second storage unit for storing a second liquid medication. In an embodiment, one of the first liquid medication and the second liquid medication may be selectively injected into a target of injection through the common needle module as needed by controlling a valve or the like.

For example, when blood glucose needs to be lowered, a first liquid medication may be received by closing the connection to the second storage unit by controlling the valve and injected into a target of injection. When blood glucose needs to be increased, a second liquid medication may be received by closing the connection to the first storage unit by controlling the valve and injected into a target of injection.

Therefore, by applying the common needle module to the first liquid medication injection unit and the second liquid medication injection unit in common, the space for needle module arrangement may be reduced, thereby increasing the design freedom of the space in the entire housing and reducing energy for controlling a needle module.

Therefore, convenience of handling and management of the liquid medication control injection device including the blood glucose measuring unit, the first liquid medication injection unit, and the second liquid medication injection unit may be improved.

As a result, through the liquid medication control injection device of the present embodiment, it is possible to increase user convenience and precisely control the injection of the first liquid medication and injection of the second liquid medication, thereby precisely controlling the blood glucose of a user.

Figure 16:
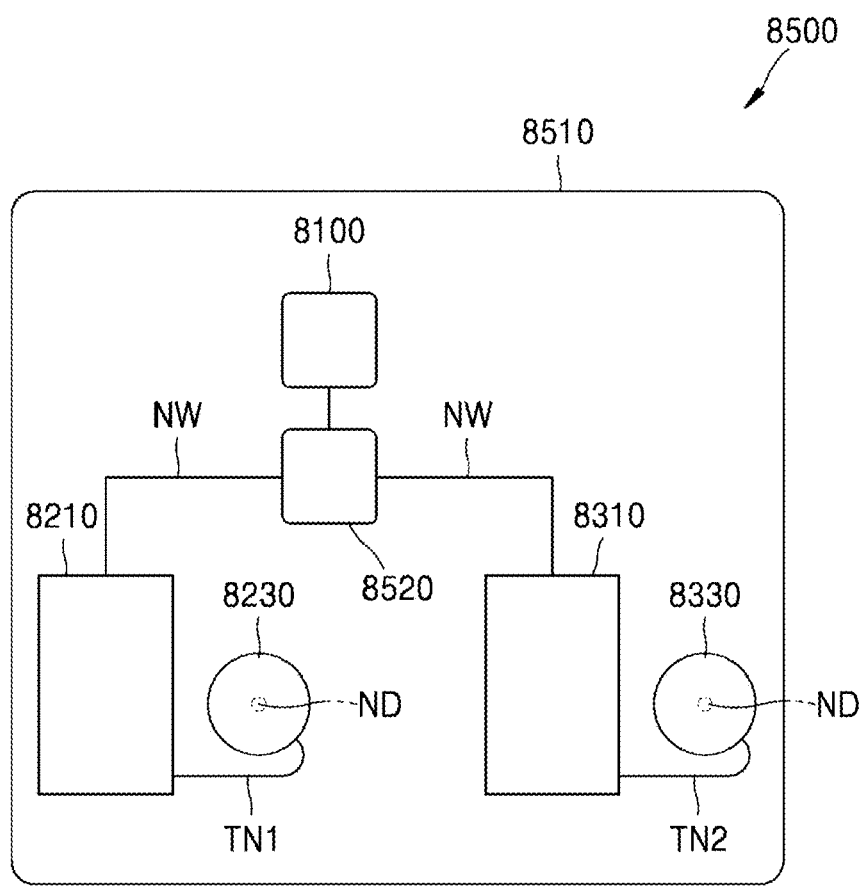
FIG. 16 is a schematic view for describing a liquid medication control injection device according to another embodiment of the present disclosure.

FIG. 16 is a schematic view for describing a liquid medication control injection device according to another embodiment of the present disclosure.

Referring to FIG. 16, a liquid medication injection device 8500 of the present embodiment may include a blood glucose measuring unit 8100, a first liquid medication injection unit 8200, a second liquid medication injection unit 8300, and a housing 8510.

A housing 8510 may have an integrated shape, e.g., a box-like shape.

According to an optional embodiment, the housing 8510 may have a shape including a base and a detachable cover.

One region or the entire region of each of a blood glucose measuring unit 8100, a first liquid medication injection unit 8200, and a second liquid medication injection unit 8300 may be covered by the housing 8510.

For example, a cover (not shown) of the housing 8510 may have a shape that covers one region or the entire region of each of the blood glucose measuring unit 8100, the first liquid medication injection unit 8200, and the second liquid medication injection unit 8300.

The blood glucose measuring unit 8100 may be configured to measure a user's blood glucose sequentially at least a plurality of number of times.

According to an optional embodiment, the blood glucose measuring unit 8100 may continuously measure a user's blood glucose periodically or at irregular intervals for at least a set period of time and may include, for example, a continuous glucose monitoring (CGM).

The first liquid medication injection unit 8200 may include a first storage unit 8210, a common driving unit 8520, and a first needle module 8230.

The first liquid medication injection unit 8200 may be configured to reflect blood glucose information measured by the blood glucose measuring unit 8100 and inject a first liquid medication containing ingredients for controlling a decrease in a user's blood glucose to the user.

For example, the first liquid medication injected to a user through the first liquid medication injection unit 8200 may contain insulin.

According to an optional embodiment, the first liquid medication injection unit 8200 may include the first storage unit 8210 for storing the first liquid medication.

Any one of storage units described in the above embodiments may be selectively applied as the first storage unit 8210, and thus detailed descriptions thereof will be omitted.

In an embodiment, according to an optional embodiment, the first liquid medication injection unit 8200 may include a module for injecting the first liquid medication to a user, e.g., the first needle module 8230.

The first needle module 8230 may include at least one needle ND. The needle ND has a hollow shape through which an empty space is formed, and the first liquid medication of the first storage unit 8210 may be injected to a target of injection through the empty space.

Any one of needle modules described in the above embodiments may be selectively applied as the first needle module 8230, and thus detailed descriptions thereof will be omitted.

According to an optional embodiment, the first liquid medication injection unit 8200 may include the common driving unit 8520 for transferring the first liquid medication from the first storage unit 8210 to the first needle module 8230.

The common driving unit 8520 may be connected to a power supply (not shown).

The common driving unit 8520 may selectively include any one of driving units described in the above embodiments and may include, for example, a pump unit.

The first liquid medication injection unit 8200 may inject the first liquid medication once, a plurality of number of times, or continuously as needed by using blood glucose information from the blood glucose measuring unit 8100.

According to an optional embodiment, through a controller (not shown), when a blood glucose level measured by the blood glucose measuring unit 8100 exceeds a set range, the first liquid medication may be injected by the first liquid medication injection unit 8200. For example, the common driving unit 8520 may be controlled through the controller (not shown) to control injection of a liquid medication to the first needle module 8230.

The controller (not shown) may be included in the blood glucose measuring unit 8100 and may be included in the first liquid medication injection unit 8200 or the second liquid medication injection unit 8300.

In an embodiment, the controller (not shown) may be provided as a separate member.

According to an optional embodiment, the controller notifies a value measured by the blood glucose measuring unit 8100 to a user, and the user may manipulate the controller to control the injection of the first liquid medication injection unit 8200 or the second liquid medication injection unit 8300.

The second liquid medication injection unit 8300 may include a second storage unit 8310, the common driving unit 8520, and a second needle module 8330.

The second liquid medication injection unit 7300 may be configured to reflect blood glucose information measured by the blood glucose measuring unit 8100 and inject a second liquid medication containing ingredients for controlling an increase in a user's blood glucose to the user.

For example, the second liquid medication injected to a user through the second liquid medication injection unit 8300 may contain glucagon.

The second liquid medication injection unit 8300 may include the second storage unit 8310 for storing the second liquid medication.

In an embodiment, according to an optional embodiment, the second liquid medication injection unit 8300 may include a module for injecting the second liquid medication to a user (e.g., the second needle module 8330), and the second liquid medication may be easily injected through the skin of the user through the second needle module 8330.

According to an optional embodiment, the second liquid medication injection unit 8300 may include the common driving unit 8520 for transferring the second liquid medication from the second storage unit 8310 to the second needle module 8330.

The second liquid medication injection unit 8300 may inject the second liquid medication once, a plurality of number of times, or continuously as needed by using blood glucose information from the blood glucose measuring unit 8100.

According to an optional embodiment, the blood glucose measuring unit 8100 and the second liquid medication injection unit 8300 may each include a communication unit to transmit information via a wire or wirelessly.

According to an optional embodiment, through a controller (not shown), when a blood glucose level measured by the blood glucose measuring unit 8100 is less than the lower limit of a set range, the second liquid medication may be injected by the second liquid medication injection unit 8300. For example, the common driving unit 8520 may be controlled to control injection of a liquid medication to the second needle module 8330.

Although not shown, the second liquid medication injection unit 8300 may include all or some of the same components as the driving unit, the storage unit, and the needle module included in the first liquid medication injection unit 8200.

The present embodiment includes the common driving unit 8520 that transmits a driving force to transfer the first liquid medication of the first storage unit 8210 to the first needle module 8230 and transmits a driving force to transfer the second liquid medication of the second storage unit 8310 to the second needle module 8330.

The common driving unit 8520 is connected to the first storage unit 8210 in which the first liquid medication is stored and the second storage unit 8310 in which the second liquid medication is stored, and thus the common driving unit 8520 may be controlled to selectively supply the first liquid medication to the first needle module 8230 or the second liquid medication to the second needle module 8330.

Therefore, it is possible to selectively and easily inject a desired liquid medication from between the first liquid medication and the second liquid medication to a target of injection through the common driving unit 8520.

A liquid medication control injection device of the present embodiment may measure a user's blood glucose at least a plurality of number of times through a blood glucose measuring unit or, according to optional embodiments, may continuously measure the blood glucose periodically or irregularly. As a specific example, real-time blood glucose measurement may be performed.

The first liquid medication injection unit and the second liquid medication injection unit of the liquid medication control injection device may selectively inject the first liquid medication or the second liquid medication by using blood glucose information regarding a user measured by the blood glucose measuring unit.

Therefore, precise blood glucose control for a user, e.g., a user having difficulty in controlling blood glucose, may be easily implemented through the liquid medication control injection device.

In an embodiment, the first liquid medication injection unit or the second liquid medication injection unit may include a storage unit for storing a liquid medication, a needle module formed to inject the liquid medication into a target of injection, and a driving unit for driving the movement of the liquid medication. The configuration may facilitate smooth injection of the first liquid medication or the second liquid medication. In an embodiment, energy for driving the driving unit may be easily supplied to the driving unit through the power supply, and thus the operation of the liquid medication control injection device may be smoothly maintained.

Meanwhile, a common driving unit connected to the first storage unit and the second storage unit and selectively provide a driving force thereto may be included. In an embodiment, by controlling the common driving unit, a first liquid medication of the first storage unit may be transferred to a first needle module or a second liquid medication of the second storage unit may be transferred to a second needle module selectively as needed, thereby injecting one of the first liquid medication and the second liquid medication into a target of injection.

For example, when blood glucose needs to be lowered, by controlling the common driving unit to transmit a driving force to the first storage unit, not to transmit a driving force to the second storage unit, the first liquid medication may be supplied to the first needle module and injected to a target of injection. When blood glucose needs to be increased, by controlling the common driving unit to transmit a driving force to the second storage unit, not to transmit a driving force to the first storage unit, the second liquid medication may be supplied to the second needle module and injected to a target of injection.

Therefore, by applying the common driving unit to the first liquid medication injection unit and the second liquid medication injection unit in common, the space for driving unit arrangement may be reduced, thereby increasing the design freedom of the space in the entire housing and reducing energy for controlling a driving unit.

In an embodiment, the blood glucose measuring unit, the first liquid medication injection unit, and the second liquid medication injection unit may be arranged inside the housing and, for example, at least one region of each of them may be covered by a cover of the housing. In an embodiment, as a specific example, the blood glucose measuring unit, the first liquid medication injection unit, and the second liquid medication injection unit may be integrated with one another. Therefore, convenience of handling and management of the liquid medication control injection device including the blood glucose measuring unit, the first liquid medication injection unit, and the second liquid medication injection unit may be improved.

As a result, through the liquid medication control injection device of the present embodiment, it is possible to increase user convenience and precisely control the injection of the first liquid medication and injection of the second liquid medication, thereby precisely controlling the blood glucose of a user.

Figure 17:
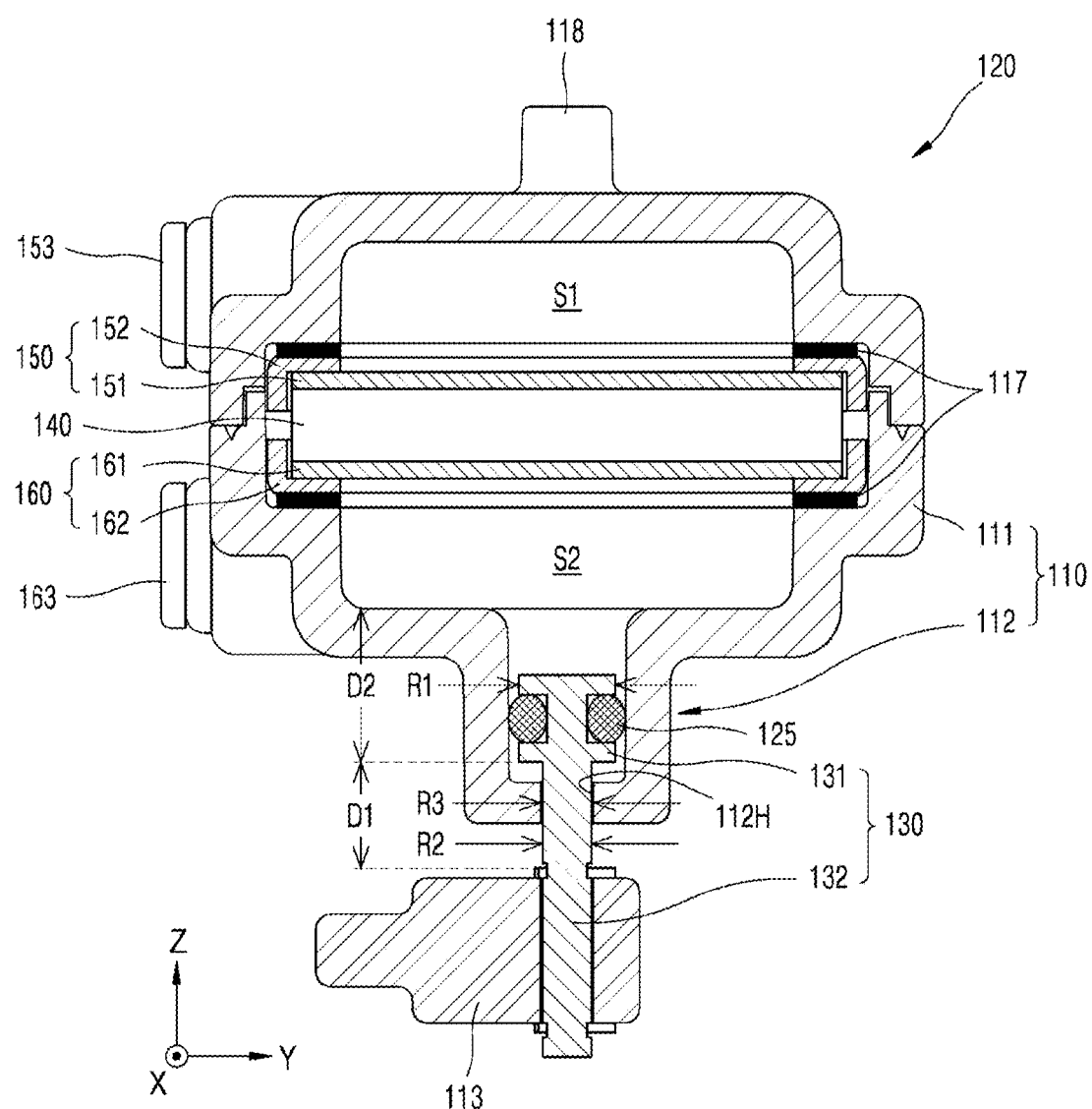
FIG. 17 is a view of an optional embodiment of a driving unit included in a liquid medication control injection device according to another embodiment of the present disclosure.

FIG. 17 is a view of an optional embodiment of a driving unit included in a liquid medication control injection device according to another embodiment of the present disclosure.

For example, FIG. 17 shows a pump unit 120 that may be applied to one of a first driving unit of a first liquid medication injection unit, a second driving unit of a second liquid medication injection unit, or a common driving unit included in the liquid medication control injection device.

In detail, the pump unit 120 and pumps described in below embodiments may be applied as they are or partially to at least any one of the first driving unit, the second driving unit, and the common driving unit of the above embodiments or some modifications may be made therein.

Referring to FIG. 17, a housing 110 of a pump unit 120 includes a shaft hole 112H provided on one side thereof, and a shaft 130 having a predetermined length through the shaft hole 112H may be connected to the outside of the housing 110. In one embodiment, the shaft hole 112H may be formed in a protrusion 112 extending to one side with respect to a body 111 of the housing 110, and a diameter of the protrusion 112 may be formed smaller than a diameter of the body 111.

A first portion 131 of the shaft 130 may be disposed inside the housing 110, and a second portion 132 may extend outside of the housing 110 past the shaft hole 112H. The shaft 130 may reciprocate along a vertical direction (z direction) in FIG. 17. When the shaft 130 reciprocates, the first portion 131 may linearly reciprocate in an inner space of the housing 110, for example, an inner space corresponding to the protrusion 112. Since a diameter R1 of the first portion 131 of the shaft 130 is larger than a diameter R3 of the shaft hole 112H, the first portion 131 may not fall out of the housing 110.

As an alternative embodiment, the second portion 132 of the shaft 130 may have a diameter R2 smaller than the diameter R3 of the shaft hole 112H. At this time, the second portion 132 may be combined with a movement control unit 113 disposed on the outside of the housing 110, so that the second portion 132 is prevented from being pulled out of the shaft hole 112H.

A sealing material 125 may be disposed on a side surface of the first portion 131 of the shaft 130. The inner space of the housing 110, for example, a space defined by an inner surface of the housing 110 and an inner surface of the shaft 130, is an enclosed space, the fluid exists in the inner space, and the sealing material 125 may limit fluid leakage through a gap between the housing 110 and the shaft 130. For convenience of explanation, FIG. 17 is illustrated with the fluid omitted.

According to an embodiment, as illustrated in FIG. 17, the sealing material 125 may have an O-ring form and cover the side surface of the first portion 131, and the leakage of the fluid existing inside the housing 110 to the outside of the housing 110 through the shaft hole 112H may be prevented by the sealing material 125. The leakage of the fluid may be more effectively limited by making a first distance D1 from the first portion 131 of the shaft 130 to the movement control unit 113 equal to or smaller than an inner length D2 of the protrusion 112.

A membrane 140 may be disposed in the inner space of the housing 110, for example, in the inner space corresponding to the body 111. The inner space includes a first space S1 and a second space S2 respectively located on both sides of the membrane 140. In FIG. 17, a space far from the shaft 130 with respect to the membrane 140 is the first space S1, and a space adjacent to the shaft 130 with respect to the membrane 140 is the second space S2.

The membrane 140 may have a porous structure in which fluid and ion may move. The membrane 140 may be, for example, a frit-type membrane prepared by thermally calcining spherical silica. For example, the spherical silica used to form the membrane may have a diameter of about 20 nm to about 500 nm, specifically, may have a diameter of about 30 nm to about 300 nm, and more specifically, may have a diameter of about 40 nm to about 200 nm. When the diameter of the spherical silica satisfies the above-mentioned range, a pressure by a first fluid passing through the membrane 140, that is, a pressure sufficient to move the shaft 130 may be generated.

Although it has been described that the membrane 140 includes the spherical silica, the membrane 140 is not limited thereto. In another embodiment, any material capable of causing an electrokinetic phenomenon by zeta potential, such as porous silica or porous alumina, may be used for the membrane 140.

The membrane 140 may have a thickness of about 20 μm to about 10 mm, specifically, may have a thickness of about 300 μm to about 5 mm, and more specifically, may have a thickness of about 1,000 μm to about 4 mm.

A first electrode body 150 and a second electrode body 160 are disposed on both sides of the membrane 140, respectively. The first electrode body 150 may include a first porous plate 151 and a first electrode strip 152 disposed on a first side of the membrane 140. The second electrode body 160 may include a second porous plate 161 and a second electrode strip 162 disposed on a second side of the membrane 140.

The first and second porous plates 151 and 161 may be arranged to contact both main surfaces of the membrane 140, respectively. The first and second porous plates 151 and 161 may effectively transport the fluid and the ion through their porous structures. The first and second porous plates 151 and 161 may have a structure in which an electrochemical reaction material is formed on a porous base layer. The electrochemical reaction material may be formed by electrodeposition or coating on the porous base layer through methods such as electroless plating, vacuum deposition, coating, and sol-gel process.

The porous base layer may be an insulator. For example, the porous base layer may include at least one selected from a non-conductive ceramic, a non-conductive polymer resin, a non-conductive glass, and a combination thereof.

The non-conductive ceramic may include, for example, at least one selected from a group consisting of rock wool, gypsum, ceramic, cement, and a combination thereof, and specifically, at least one selected from a group consisting of rock wool, gypsum, and a combination thereof, but is not limited thereto.

The non-conductive polymer resin may include, for example, one or more selected from a group consisting of synthetic fiber such as it selected from a group consisting of polypropylene, polyethylene terephthalate, polyacrylonitrile, and a combination thereof; natural fiber such as it selected from a group consisting of wool, cotton, and a combination thereof; sponge; porous material derived from an organism, for example, a bone of the organism; and a combination thereof, but is not limited thereto.

The non-conductive glass may include at least one selected from a group consisting of glass wool, glass frit, porous glass, and a combination thereof, but is not limited thereto.

The porous base layer may have a pore size of about 0.1 μm to about 500 μm, specifically, a pore size of about 5 μm to about 300 μm, and more specifically, a pore size of about 10 μm to about 200 μm. When the pore size of the porous support satisfies the above-mentioned range, it is possible to effectively move the fluid and ion, thereby improving stability, lifespan and efficiency of the pump unit 120.

The electrochemical reaction material may include a material capable of forming a pair of reactions in which an oxidizing electrode and a reducing electrode exchange cation, for example, hydrogen ion during an electrode reaction of the first and second electrode bodies 150 and 160, and at the same time composing a reversible electrochemical reaction. The electrochemical reaction material may include, for example, one or more selected from a group consisting of silver/silver oxide, silver/silver chloride, MnO (OH), polyaniline, polypyrrole, polythiophene, polythionine, or quinone-based polymer, and a combination thereof.

The first and second strips 152 and 162 may be disposed on the edges of the first and second porous plates 151 and 161, and may be connected to first and second terminals 153 and 163 on the outside of the housing 110. The first and second strips 152 and 162 may include a conductive material such as silver, copper, or the like.

The fluid provided in the inner space of the housing 110 may include the first fluid and a second fluid having different phases. The first fluid may contain a liquid such as water and the second fluid may contain a gas such as air. The first fluid existing in the inner space does not completely fill the inner space. That is, volume of the inner space is larger than volume of the first fluid existing in the inner space. The second fluid exists in a part of the inner space where water does not exist.

A sealing material 117 is disposed on both sides of a structure of the membrane 140, the first electrode body 150 and the second electrode body 160. The sealing material 117 may have a ring form having an area corresponding to the edge of the structure described above. The aforementioned fluid, such as the first fluid, moves from the first space S1 to the second space S2 or vice versa along a thickness direction of the membrane 140 to pass through the membrane 140, wherein the sealing material 117 may block a gap between the inner surface of the housing 110 and the structure to prevent the liquid from moving into the gap.

The fluid may be introduced into the inner space through inlets 118. In one embodiment, after filling the inner space entirely with the first fluid through the inlets 118 on both sides, a portion of the first fluid is withdrawn through any one of the inlets 118 and then the inlets 118 is closed. Therefore, the first fluid and the second fluid may exist in the inner space of the housing 110.

Although not illustrated, the first electrode body 150 and the second electrode body 160 may each be connected to a power source through a terminal, and the direction of movement of the liquid such as water may be changed by alternately changing polarities of voltage of the power source.

In an embodiment, it is possible to control the movement of the shaft 130 of the pump unit 120 through this control. Through the movement of the shaft 130, the movement of the first liquid medication or the second liquid medication of the previous embodiments can be finely adjustable.

Figure 18:
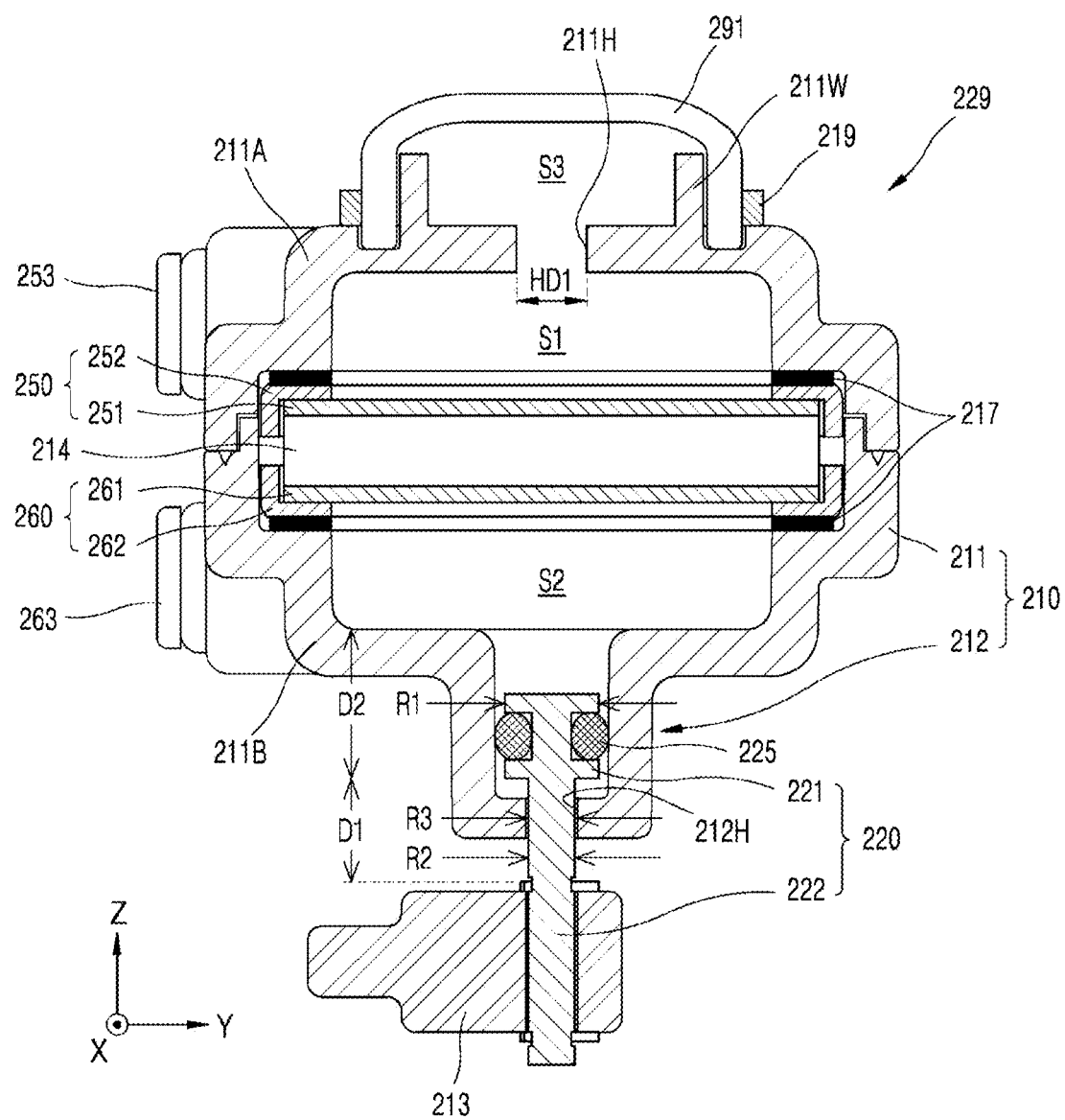
FIG. 18 is a view of an optional embodiment of a driving unit included in a liquid medication control injection device according to another embodiment of the present disclosure.

FIG. 18 is a view of an optional embodiment of a driving unit included in a liquid medication control injection device according to another embodiment of the present disclosure.

For example, FIG. 18 shows a pump unit 229 that may be applied to one of a first driving unit of a first liquid medication injection unit, a second driving unit of a second liquid medication injection unit, or a common driving unit included in the liquid medication control injection device.

The pump unit 229 of FIG. 18 may be a type of pump using electric osmotic pressure.

Referring to FIG. 18, a housing 210 of the pump unit 229 includes a shaft hole 212H provided on one side, and a shaft 220 having a predetermined length may be extended to an outside of the housing 210 through the shaft hole 212H.

In one embodiment, the shaft hole 212H may be formed in a protrusion 212 extending to one side with respect to a body 211 of the housing 210, and a diameter of the protrusion 212 may be formed smaller than a diameter of the body 211.

A first portion 221 of the shaft 220 is disposed inside the housing 210, and a second portion 222 extends to the outside of the housing 210 through the shaft hole 212H as described above. The shaft 220 may reciprocate along a vertical direction (z direction).

The second portion 222 of the shaft 220 may have a diameter R2 smaller than a diameter R3 of the shaft hole 212H, and as an alternative embodiment, the second portion 222 may be coupled with a movement control unit 213 disposed outside of the housing 210.

A sealing material 225 may be disposed on a side surface of the first portion 221 of the shaft 220.

A membrane 214 may be disposed in an inner space of the housing 210, for example, in an inner space corresponding to the body 211. The inner space includes a first space S1 and a second space S2 located on both sides of the membrane 214, respectively.

In FIG. 18, a space far from the shaft 220 with respect to the membrane 214 is the first space S1, and a space adjacent to the shaft 220 with respect to the membrane 214 is the second space S2.

The membrane 214 may have a porous structure in which fluid and ion may move. The membrane 214 may be, for example, a frit-type membrane prepared by thermally calcining spherical silica. For example, the spherical silica used to form the membrane may have a diameter of about 20 nm to about 500 nm, specifically, may have a diameter of about 30 nm to about 300 nm, and more specifically, may have a diameter of about 40 nm to about 200 nm.

When the diameter of the spherical silica satisfies the above-mentioned range, a pressure by a first fluid passing through the membrane 214, that is, a pressure sufficient to move the shaft 220 may be generated.

Although it has been described that the membrane 214 includes the spherical silica, the membrane 214 is not limited thereto.

In another embodiment, any material capable of causing an electrokinetic phenomenon by zeta potential, such as porous silica or porous alumina, may be used for the membrane 214.

The membrane 214 may have a thickness of about 20 μm to about 10 mm, specifically, may have a thickness of about 300 μm to about 5 mm, and more specifically, may have a thickness of about 1,000 μm to about 4 mm.

A first electrode body 250 and a second electrode body 260 are disposed on both sides of the membrane 214, respectively. The first electrode body 250 may include a first porous plate 251 and a first electrode strip 252 disposed on a first side of the membrane 214. The second electrode body 260 may include a second porous plate 261 and a second electrode strip 262 disposed on a second side of the membrane 214.

The first and second porous plates 251 and 261 may be arranged to contact both main surfaces of the membrane 214, respectively. The first and second porous plates 251 and 261 may effectively transport fluid and ion through their porous structures.

The first and second porous plates 251 and 261 may have a structure in which an electrochemical reaction material is formed on a porous base layer. The electrochemical reaction material may be formed by electrodeposition or coating on the porous base layer through methods such as electroless plating, vacuum deposition, coating, and sol-gel process.

The porous base layer may be an insulator. For example, the porous base layer may selectively apply one or more of the materials described in the embodiment of FIG. 6 described above.

When a pore size of a porous support satisfies the above-mentioned range, it is possible to effectively move the fluid and ion, thereby improving stability, lifespan and efficiency of the pump unit 229.

The electrochemical reaction material may include a material capable of forming a pair of reactions in which an oxidizing electrode and a reducing electrode exchange cation, for example, hydrogen ion during an electrode reaction of the first and second electrode bodies 250 and 260, and at the same time composing a reversible electrochemical reaction.

The electrochemical reaction material may include, for example, one or more selected from a group consisting of silver/silver oxide, silver/silver chloride, MnO (OH), polyaniline, polypyrrole, polythiophene, polythionine, or quinone-based polymer, and a combination thereof.

The first and second strips 252 and 262 may be disposed on the edges of the first and second porous plates 251 and 261, and may be connected to first and second terminals 253 and 263 on the outside of the housing 210. The first and second strips 252 and 262 may include a conductive material such as silver, copper, or the like.

The fluid provided in the inner space of the housing 210 may include the first fluid and a second fluid having different phases. The first fluid may contain a liquid such as water and the second fluid may contain a gas such as air.

The first fluid existing in the inner space does not completely fill the inner space. That is, volume of the inner space is larger than volume of the first fluid existing in the inner space. The second fluid exists in a part of the inner space where water does not exist.

A sealing material 217 is disposed on both sides of a structure of the membrane 214, the first electrode body 250 and the second electrode body 260. The sealing material 217 may have a ring form having an area corresponding to the edge of the structure described above.

The aforementioned fluid, such as the first fluid, moves from the first space S1 to the second space S2 or vice versa along a thickness direction of the membrane 214 to pass through the membrane 214, wherein the sealing material 217 may block a gap between the inner surface of the housing 210 and the structure to prevent the liquid from moving into the gap.

The motion of the fluid and the movement of the shaft accordingly will be described.

The first electrode body 250 and the second electrode body 260 are electrically connected to a power supply unit through the first and second terminals 253 and 263, respectively, and polarities of voltage supplied by the power supply unit is alternately changed, so that the direction of movement of the fluid, such as water, may be changed.

In one embodiment, when silver/silver oxide is used as an electrochemical reactant and the first fluid is a solution containing water, when the first electrode body 250 is the oxidizing electrode and the second electrode body 260 is the reducing electrode, the cation (e.g., hydrogen ion) generated according to an oxidation reaction in the first electrode body 250 moves toward the second electrode body 260 through the membrane 214 by the voltage difference, at this time, a predetermined pressure may be generated as water ($H_2O$) moves together with the cation.

Through this control, the movement of the shaft 220 of the pump unit 229 may be controlled.

Figure 19:
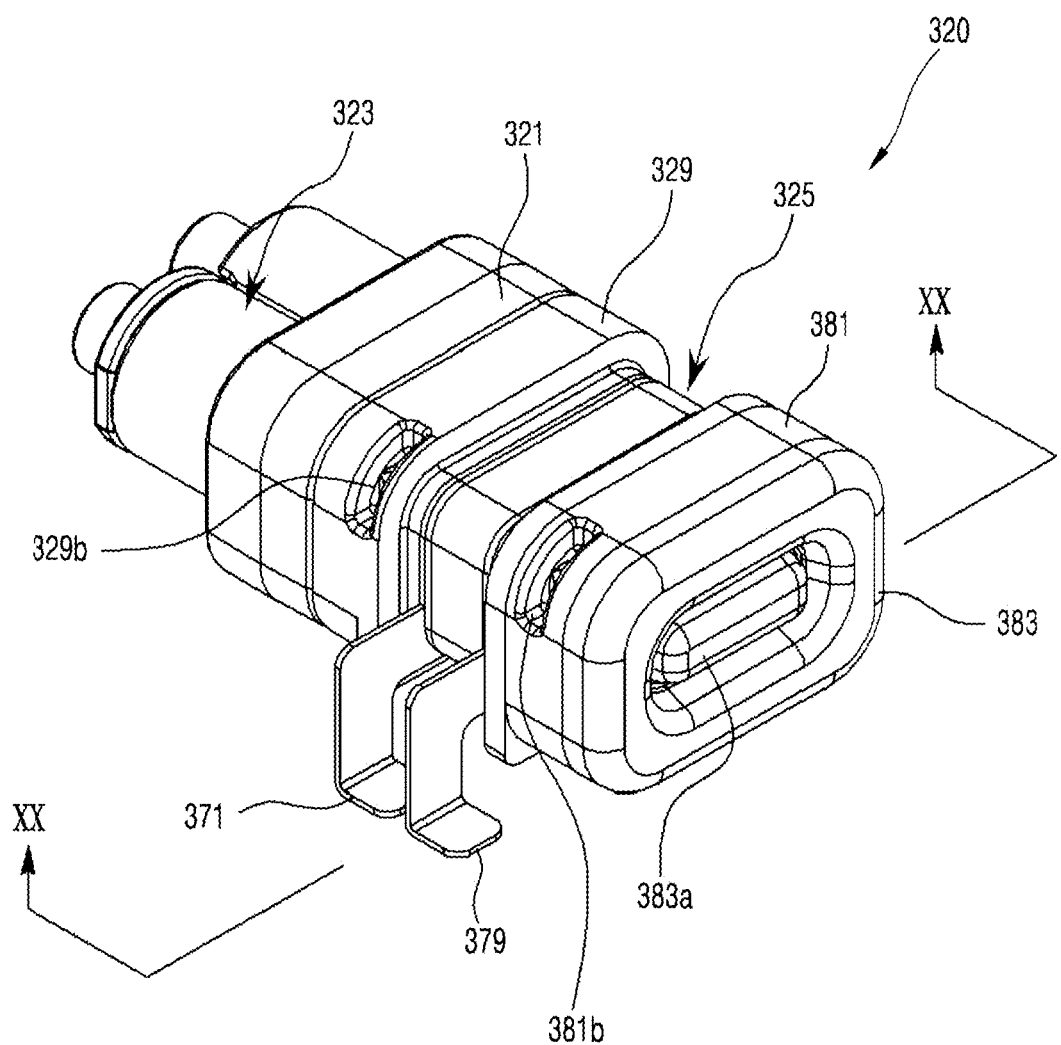
FIG. 19 is a perspective view of an optional embodiment of a driving unit included in a liquid medication control injection device according to another embodiment of the present disclosure.
Figure 20:
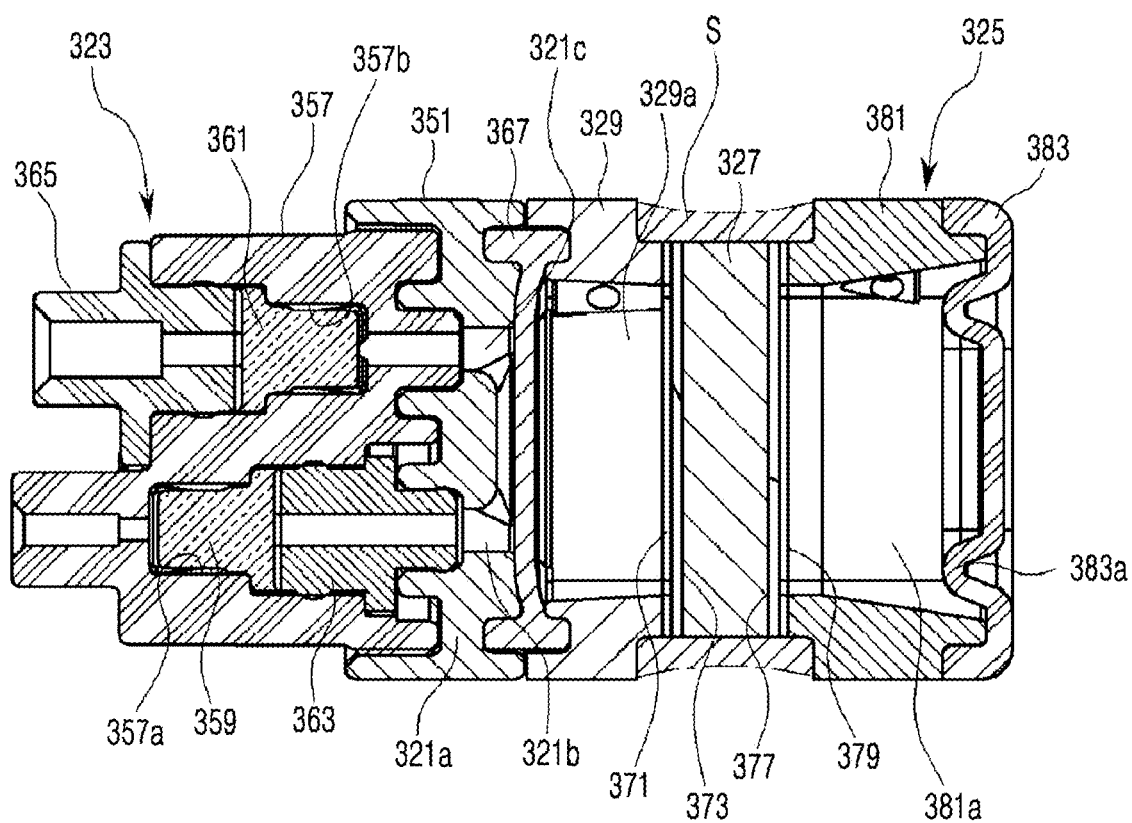
FIG. 20 is a cross-sectional view taken along a line XX-XX of FIG. 19.

FIG. 19 is a perspective view of an optional embodiment of a driving unit included in a liquid medication control injection device according to another embodiment of the present disclosure. FIG. 20 is a cross-sectional view taken along a line XX-XX of FIG. 19.

For example, FIG. 19 shows a pump unit 320 that may be applied to one of a first driving unit of a first liquid medication injection unit, a second driving unit of a second liquid medication injection unit, or a common driving unit included in the liquid medication control injection device.

A pump 320 of the present embodiment may include a connector 321 and a check valve assembly 323, and may additionally include a driving unit 325.

The check valve assembly 323 may be coupled to one side of the connector 321, and the driving unit 325 may be coupled to the other side. The connector 321 may include a partition wall 321a that partitions the check valve assembly 323 and the driving unit 325. An inlet 321b and an outlet 321c may be provided in the partition wall 321a.

The inlet 321b and the outlet 321c are spaced apart from each other and are disposed through the partition wall 321a.

The check valve assembly 323 may include a valve housing 357, an inlet check valve 359, an outlet check valve 361, a first fixture 363 and a second fixture 365.

An inlet extension conduit 357a and an outlet extension conduit 357b may be provided in the valve housing 357. The valve housing 357 may be coupled to one side of the connector 321. In addition, the inlet extension conduit 357a is connected to the inlet 321b, and the outlet extension conduit 357b is connected to the outlet 321c.

The inlet check valve 359 is placed on the inlet extension conduit 357a to control a passage direction of the fluid. The outlet check valve 361 is disposed on the outlet extension conduit 357b to control a passage direction of the fluid.

Flexible, low opening pressure duckbill valves may be used for the inlet check valve 359 and the outlet check valve 361. Due to these inlet check valve 359 and outlet check valve 361, the transfer efficiency of the fluid is increased compared to the amount of power consumption, so that it may be operated for a long time, and the marketability may be increased.

The first fixture 363 may be inserted into the inlet extension conduit 357a to fix the inlet check valve 359. The second fixture 365 may be inserted into the outlet extension conduit 357b to fix the outlet check valve 361.

The first fixture 363 and the second fixture 365 are preferably provided with conduits.

In the embodiment of the present disclosure, an example in which the inlet check valve 359 and the outlet check valve 361 are coupled to the valve housing 357 has been described, but is not limited thereto, and it is also possible that the inlet check valve 359 and the outlet check valve 361 are respectively coupled to the inlet 321b and the outlet 321c provided in the connector 321. In this other example, the valve housing 357 is integrally formed with the connector 321, so that it may be manufactured with a simpler structure. Another example of the embodiment of the present disclosure may further lower the manufacturing cost by reducing the number of parts and may be manufactured compactly.

The driving unit 325 is coupled to one side of the connector 321. The driving unit 325 is preferably disposed on the opposite side to which the check valve assembly 323 is coupled. The driving unit 325 is preferably arranged in isolation from fluid passing through the check valve assembly 323. The driving unit 325 may provide pressure to the fluid passing through the check valve assembly 323.

The driving unit 325 may include a first diaphragm 367, a first pump housing 329, a first power supply line 371, a first electrode 373, a membrane 327, a second electrode 377, a second power supply line 379, a second pump housing 381, and a second diaphragm 383.

The first diaphragm 367 is coupled to one side of the connector 321. A space may be provided between the first diaphragm 367 and the connector 321. That is, the first diaphragm 367 is coupled to the connector 321 by maintaining a constant space in the connector 321. Therefore, the fluid in the check valve assembly 323 does not move to the driving unit 325 by the first diaphragm 367 and remains isolated.

A surface of the first diaphragm 367 may be repeatedly moved in a certain section in an axial direction by the pressure generated by the driving unit 325. In some cases, the first diaphragm 367 may be provided with a corrugation portion that allows the surface to move smoothly in the axial direction.

The first diaphragm 367 described above is coupled to one side of the first pump housing 329. The first pump housing 329 may be provided with a space 329a which extends along the axial direction. Therefore, the first pump housing 329 may be closed on one side of the space 329a by the first diaphragm 367.

The first electrode 373 is coupled to the other side of the first pump housing 329 so that the space 329a formed by the first pump housing 329 may be closed. And the first pump housing 329 may accommodate a working fluid such as water in the space 329a provided therein.

The first pump housing 329 may be provided with a hole portion 329b for fluid injection on an outer periphery. This hole portion 329b may be sealed after the working fluid is injected into the first pump housing 329. Therefore, the working fluid of the driving unit 325 may be isolated from the liquid medication in the check valve assembly 323.

The first power supply line 371 may supply power to the first electrode 373. The first power supply line 371 may be disposed along an edge of the first pump housing 329 and may be fixed in contact with the first electrode 373. The first power supply line 371 may be disposed between the first pump housing 329 and the first electrode 373. However, as another example of the embodiment of the present disclosure, the first power supply line 371 may be disposed between the first electrode 373 and the membrane 327 if only power may be supplied to the first electrode 373.

The first electrode 373 may be formed in a plate shape to close the space 329a of the first pump housing 329. That is, the first pump housing 329 may form the space 329a by the first diaphragm 367 and the first electrode 373. In addition, the working fluid such as water is accommodated in the space 329a of the first pump housing 329.

The membrane 327 may be made of a porous material through which the working fluid and ion move. The membrane 327 may include a non-conductive material such as ceramic. When the membrane 327 is made of the non-conductive material, a side reaction does not occur even if the porous membrane 327 is exposed as the electrochemical reaction material used for the first electrode 373 and the second electrode 377 is consumed or desorbed due to the operation of the electric osmosis pump of the present disclosure for a long time. Therefore, unnecessary power consumption due to the side reaction may be prevented. Therefore, the present disclosure has safe driving characteristics and may improve durability.

A flexible material that does not exhibit conductivity such as polymer resin, rubber, urethane or plastic film may be processed into a thin film and used for the membrane 327.

The second electrode 377 is disposed on the other side of the membrane 327. That is, the membrane 327 may be disposed between the first electrode 373 and the second electrode 377. The second power supply line 379 may supply external power to the second electrode 377. The second power supply line 379 may be coupled to a rim of the second pump housing 381. However, as long as the second power supply line 379 may only supply power to the second electrode 377, any arrangement is possible.

The second pump housing 381 has the same or similar shape as the first pump housing 329. Another space 381a may be provided through the interior of the second pump housing 381 in the axial direction. Like the first pump housing 329, a hole portion 381b penetrating the inner space 381a of the second pump housing 381 may be provided. The hole portion 381b of the second pump housing 381 may be sealed by a sealing agent or filled by fusion or the like after injecting the working fluid.

The second diaphragm 383 may be coupled to one side of the second pump housing 381 to close the space 381a provided in the second pump housing 381.

That is, the second pump housing 381 may close the space 381a by the second electrode 377 and the second diaphragm 383 made of a plate shape.

In the second diaphragm 383, a corrugation portion 383a may be formed on its surface. The corrugation portion 383a formed in the second diaphragm 383 may have an uneven structure protruding in the axial direction when viewed from a cross-section. The corrugation portion 383a of the second diaphragm 383 may sufficiently move the surface of the second diaphragm 383 in the axial direction to increase pumping performance.

In the embodiment of the present disclosure, an example in which the corrugation portion 383a is formed in the second diaphragm 383 has been described, but in some cases, it is also possible that the corrugation portion is also formed in the first diaphragm 367. In addition, the corrugation portion that may be formed in the first diaphragm 367 or the second diaphragm 383 may reduce energy consumption by maximizing the deformation of the first diaphragm 367 and the second diaphragm 383 even with a small amount of energy. That is, there is an advantage that the driving unit 325 may be driven for a long time even with a small external power source.

The first pump housing 329, the first power supply line 371, the first electrode 373, the membrane 327, the second electrode 377, the second power supply line 379 and the second pump housing 381 may be sealed from the outside by an encapsulant S. That is, the first power supply line 371, the first electrode 373, the membrane 327, the second electrode 377 and the second power supply line 379 are configured to be smaller than the sizes of the first pump housing 329 and the second pump housing 381, so that the encapsulant S may be disposed in a peripheral portion (a portion exposed to the outside and forming a groove or space based on a cross-section) between the first pump housing 329 and the second pump housing 381 in the assembled state. This encapsulant S may form an airtight layer that maintains airtightness with the outside.

Figure 21:
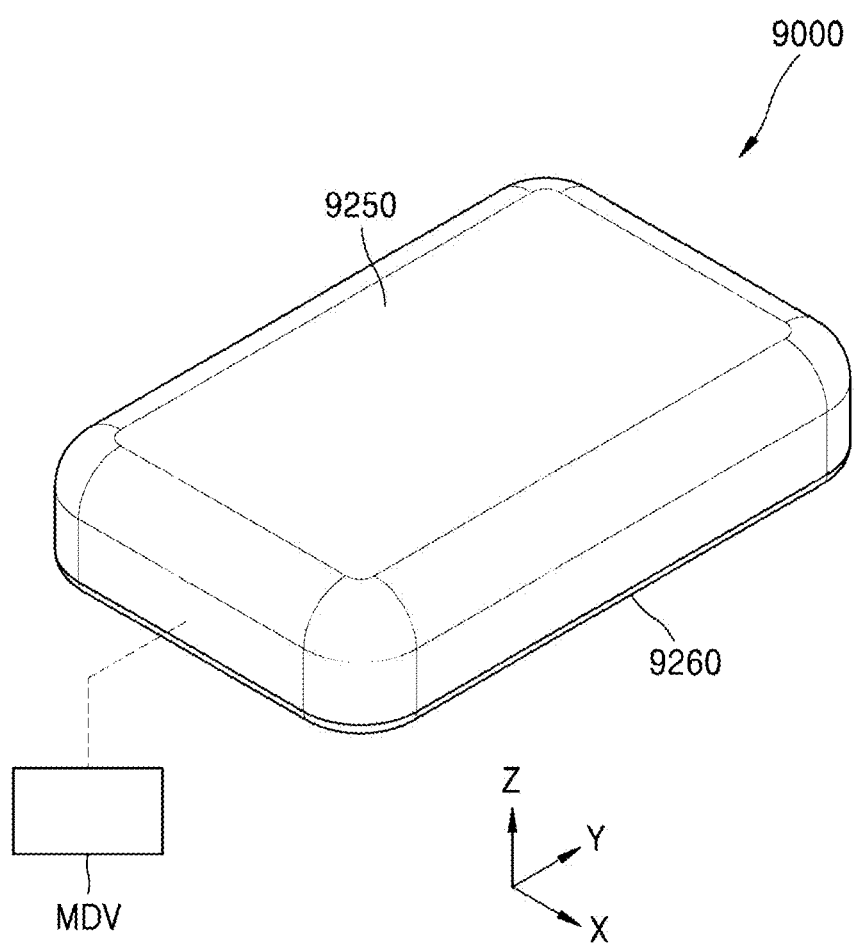
FIG. 21 is a view of another optional embodiment of a liquid medication control injection device according to another embodiment of the present disclosure.

FIG. 21 is a view of another optional embodiment of a liquid medication control injection device 9000 according to another embodiment of the present disclosure.

Referring to FIG. 21, the liquid medication control injection device 9000 may include a cover part 9250 and a base plate 9260.

At least one or a plurality of regions of the blood glucose measuring unit, the first liquid medication injection unit, and the second liquid medication injection unit according to the previous embodiments may be disposed on the base plate 9260 or supported by the base plate 9260, and may be covered by the cover part 9250. Through this, the liquid medication control injection device 9000 can be used as an integrated module, and user convenience can be improved. In one or more embodiments, the first liquid medication injection unit and the second liquid medication injection unit may be accommodated in separate housings.

In an embodiment, as an optional embodiment, the liquid medication control injection device 9000 may be connected to a terminal MDV which is placed the outside thereof. In an embodiment, the user may receive information from the liquid medication control injection device 9000 through the terminal MDV. In an embodiment, the user may start or end the operation of the liquid medication control injection device 9000 through the terminal MDV.

In addition, the operating status and performance status of the liquid medication control injection device 9000 may be identified periodically or in real time.

To this end, the terminal MDV may be connected to the liquid medication control injection device 9000 through a wired or wireless communication module, and the liquid medication control injection device 9000 may include such a communication module.

Through this, it is possible to improve the convenience of injecting the drug into the target of injection, and specifically, it is possible to easily implement the precise control of the first liquid medication and the second liquid medication, which are different drugs when the blood glucose is lowered or increased.

In addition, users such as target of injection related to liquid medication injection, guardians and medical personnel, etc. of liquid medication target of injection can easily identify information on liquid medication injection for liquid medication target of injection and changes in blood glucose after liquid medication injection, so that the blood glucose management of the target of injection can be finely adjustable.

As such, the present disclosure has been described with reference to the embodiment shown in the drawings, which is merely exemplary, and those skilled in the art will understand that various modifications and equivalent other embodiments are possible therefrom. Accordingly, the true technical protection scope of the present disclosure should be determined by the technical spirit of the appended claims.

In the specification of embodiments (especially in the claims), the use of the term "the" and referential terms similar thereto may correspond to both the singular and the plural. In addition, when a range is described in the embodiment, each individual value constituting the range is described in the detailed description as including disclosure to which individual values belonging to the range are applied, and if there is no description to the contrary. Finally, the steps constituting the method according to the embodiment may be performed in an appropriate order, unless the order is explicitly stated or there is no description to the contrary. The embodiments are not necessarily limited according to the order of description of the above steps. The use of all examples or exemplary terms (e.g., etc.) in the embodiment is merely for describing the embodiment in detail, and unless it is limited by the claims, the scope of the embodiment is not limited by the examples or exemplary terminology. Numerous modifications and adaptations will be readily apparent to those skilled in this art without departing from the spirit and scope of the present invention.

INDUSTRIAL APPLICABILITY

The specific implementations described in the embodiment are only embodiments, and do not limit the scope of the embodiment in any way. For brevity of the specification, descriptions of conventional electronic components, control systems, software, and other functional aspects of the systems may be omitted. In addition, the connection or connection members of lines between the components shown in the drawings illustratively represent functional connections and/or physical or circuit connections, and in an actual device, various functional connections, physical connections that are replaceable or additional may be referred to as connections, or circuit connections. In addition, unless there is a specific reference such as "essential" or "importantly", it may not be a necessary component for the application of this disclosure.

The invention claimed is:

1. A liquid medication control injection device comprising:
    a blood glucose measuring unit configured to measure blood glucose of a target of injection at least a plurality of times, sequentially;
    a first liquid medication injection unit configured to inject into the target of injection a first liquid medication containing a component for controlling a decrease in blood glucose of the target of injection; and
    a second liquid medication injection unit configured to inject into the target of injection a second liquid medication containing a component for controlling an increase in blood glucose of the target of injection, wherein the component of the second liquid medication is different from the component of the first liquid medication,
    further comprising:
    a cover part and a base plate,
    a common needle module that has a needle with a hollow shape through which an empty space is formed,
    a first driving unit that provides driving force to transfer the first liquid medication from the first liquid medication injection unit to the common needle module is disposed,
    a second driving unit that provides driving force to transfer the second liquid medication from the second liquid medication injection unit to the common needle module is disposed, and
    a valve disposed to control selective supply of the first liquid medication from the first liquid medication injection unit and the second liquid medication from the second liquid medication injection part,
    wherein the cover part and the base plate are disposed to surround the first liquid medication and the second liquid medication, with a first liquid medication injection unit and the second liquid medication injection unit positioned in between, and the cover part and base plate are arranged to surround the blood glucose measuring unit, and
    wherein, through the valve, the desired liquid medication from the first liquid medication and the second liquid medication is selectively supplied to the common needle module.

2. The liquid medication control injection device of claim 1, wherein the first liquid medication injection unit and the second liquid medication injection unit are configured to selectively inject the first liquid medication or the second liquid medication into the target of injection.

3. The liquid medication control injection device of claim 1, further comprising a controller configured to control driving of the first liquid medication injection unit and the second liquid medication injection unit according to blood glucose information measured by the blood glucose measuring unit.

4. The liquid medication control injection device of claim 1, wherein
    the first liquid medication injection unit or the second liquid medication injection unit comprises a housing, and
    the blood glucose measuring unit is disposed inside the housing of the first liquid medication injection unit or the housing of the second liquid medication injection unit.

5. The liquid medication control injection device of claim 1, further comprising:
    a housing configured to accommodate at least one of the blood glucose measuring unit, the first liquid medication injection unit, and the second liquid medication injection unit.

6. The liquid medication control injection device of claim 1, wherein
    the liquid medication control injection device is configured to transmit one or more pieces of information by communicating with a terminal provided separately from the liquid medication control injection device.

7. The liquid medication control injection device of claim 1, wherein
    the liquid medication control injection device is configured to be attached to an outside of a body of the target of injection to as a wearable device.

* * * * *